US012102847B2

(12) United States Patent
Gerhart et al.

(10) Patent No.: US 12,102,847 B2
(45) Date of Patent: Oct. 1, 2024

(54) HEADGEAR, IN PARTICULAR A HOOD OR A BALACLAVA, FOR PROTECTIVE CLOTHING

(71) Applicant: Blücher GmbH, Erkrath (DE)

(72) Inventors: Victoria Marie-Luisa Gerhart, Erkrath (DE); Brigitte Baggen, Erkrath (DE)

(73) Assignee: Blucher GmbH (DE)

( * ) Notice: Subject to any disclaimer, the term of this patent is extended or adjusted under 35 U.S.C. 154(b) by 199 days.

(21) Appl. No.: 17/641,652

(22) PCT Filed: Dec. 3, 2019

(86) PCT No.: PCT/EP2019/083411

§ 371 (c)(1),
(2) Date: Mar. 9, 2022

(87) PCT Pub. No.: WO2021/047789

PCT Pub. Date: Mar. 18, 2021

(65) Prior Publication Data

US 2022/0323798 A1 Oct. 13, 2022

(30) Foreign Application Priority Data

Sep. 9, 2019 (WO) ................. PCT/EP2019/025301
Sep. 10, 2019 (WO) ................. PCT/EP2019/025304

(51) Int. Cl.
*A62B 17/00* (2006.01)
*A62B 17/04* (2006.01)

(52) U.S. Cl.
CPC ............ *A62B 17/006* (2013.01); *A62B 17/04* (2013.01)

(58) Field of Classification Search
CPC ..... A62B 17/04; A62B 17/006; A62B 18/084; B63C 11/02; A41D 13/0005; A41D 13/1153; A41D 19/0089; A42B 1/046
See application file for complete search history.

(56) References Cited

U.S. PATENT DOCUMENTS

| | | | | |
|---|---|---|---|---|
| 2,446,530 A | | 8/1948 | De Grazia et al. | |
| 6,079,051 A | * | 6/2000 | Whinston .......... | A41D 13/0005 2/93 |
| 2007/0017008 A1 | * | 1/2007 | Snedeker ................ | A41F 9/025 2/456 |

(Continued)

FOREIGN PATENT DOCUMENTS

| | | | | |
|---|---|---|---|---|
| GB | 2547037 A | * | 8/2017 | ......... A41D 13/0005 |
| WO | 2017013418 | | 1/2017 | |

*Primary Examiner* — Patrick J. Lynch
(74) *Attorney, Agent, or Firm* — Edward E. Sowers; Brannon Sowers & Cracraft PC

(57) ABSTRACT

An article of protective clothing with protective functions in relation to chemical, biological, radioactive, or nuclear, respectively . . . including toxic or harmful substances such as for example warfare agents. The protective clothing can be used in both the military and the civilian sector. More specifically, one embodiment is an article of protective clothing, especially for the region of the head or the neck, respectively, in the form of a headgear which is worn, or used with a respiratory mask, also referred to as a protective breathing apparatus. The headgear has an effective seal between the headgear and the respiratory mask. A further embodiment is a method for sealing the transition between a headgear and a respiratory mask.

16 Claims, 8 Drawing Sheets

(56) References Cited

U.S. PATENT DOCUMENTS

| | | | | |
|---|---|---|---|---|
| 2007/0059504 | A1* | 3/2007 | von Blucher | A62D 5/00 428/411.1 |
| 2007/0169247 | A1* | 7/2007 | Mordecai | A62B 17/006 2/81 |
| 2007/0275619 | A1* | 11/2007 | von Blucher | A62B 17/006 442/80 |
| 2010/0287688 | A1* | 11/2010 | Stachler | A62B 17/04 2/424 |
| 2018/0207613 | A1* | 7/2018 | Böhringer | C09J 7/38 |
| 2018/0304106 | A1* | 10/2018 | O'Leary | A62B 17/001 |

* cited by examiner

HEADGEAR, IN PARTICULAR A HOOD OR A BALACLAVA, FOR PROTECTIVE CLOTHING

CROSS-REFERENCES TO RELATED APPLICATIONS

This application is a National Stage filing of International Application PCT/EP 2019/083411 filed Dec. 3, 2019, entitled "HEAD COVERING, IN PARTICULAR A HOOD OR BALACLAVA, FOR USE AS PROTECTIVE CLOTHING" claiming priority to PCT/EP/2019/025301, filed Sep. 9, 2019, and PCT/EP/2019/025304, filed Sep. 10, 2019. The subject application claims priority to PCT/EP 2019/083411, PCT/EP/2019/025301, and PCT/EP/2019/025304, and incorporates all by reference herein, in their entirety.

BACKGROUND OF THE INVENTION

The present invention relates to the technical field of protective clothing with protective functions in relation to chemical, biological, radioactive or nuclear, respectively, toxic or harmful substances (for example warfare agents) as can be used in particular in the defense as well as civilian sector (ABC protective clothing or CBRN protective clothing, respectively, where ABC=atomic, biological and chemical, and CBRN=chemical, biological, radioactive and nuclear [wherein the terms CBRN on the one hand and ABC on the other hand are presently used synonymously]). In this context, the present invention relates in particular to the technical field of protective clothing, especially for the region of the head or the neck, respectively, specifically in the form of a headgear which is in particular worn, or used, respectively, conjointly with a respiratory mask (synonymously also referred to as a protective breathing apparatus, a protective mask, a mask, a breathing mask, or the like).

Against this background, the present invention relates in particular to a headgear or a cover, respectively, which is in particular configured in the form of a hood or a balaclava and which can preferably be used for or as protective clothing.

The present invention also relates to the use of the headgear according to the invention in, for, or as protective clothing, or as a component or component part, respectively, of protective clothing which can in particular be used for the civilian or defense sector, respectively.

The present invention also relates to an item of protective clothing per se which comprises the headgear according to the invention, or which is produced while using the headgear according to the invention, respectively.

The present invention moreover also relates to the use of a sealing element in combination with a peripheral portion, or to the use of a combination of a sealing element on the one hand and of a peripheral portion on the other hand for sealing the transition between a headgear on the one hand, and a respiratory mask, or a mask body (synonymously also referred to as a respiratory mask body, or a protective breathing apparatus body or body structure, respectively, or a mask body or the like) on which the respiratory mask is based, respectively, on the other hand.

The present invention finally also relates to a method for sealing the transition between a headgear on the one hand and a respiratory mask, or a mask body on which the respiratory mask is based, respectively, on the other hand.

In the case of people such as, for example, soldiers, firefighters, police officers, members of special forces units, or the like, in which there is the risk of coming in contact with toxic or harmful substances, respectively, which can be received or resorbed, respectively, by way of the respiratory tract, it is generally indicated and necessary to guarantee corresponding protection in relation to said toxic or harmful substances, respectively, inter alia by wearing respiratory masks (ABC respiratory masks or CBRN respiratory masks, respectively). Moreover, it is often also the case that toxic or harmful substances, respectively, are received or resorbed, respectively, by way of the skin of an affected person, this representing a further high risk potential. The respective persons, in addition to a respiratory mask, also wear corresponding protective clothing (ABC or CBRN protective clothing, respectively) so as on account thereof to avoid contact between the toxic or harmful substances, respectively, and the skin or the body, respectively. In this context, items of protective clothing of this type, such as can be present for example in the form of protective suits, protective jackets, or the like, for example, often also have a corresponding head cover or headgear, respectively, for example in the form of a hood or a balaclava.

The purpose of ABC or CBRN protective clothing, respectively, is generally to be seen in offering the wearer or user, respectively, optimal protection in relation to toxins or warfare agents, respectively, (hazardous materials, warfare agents, or the like), and specifically with a view to the user of such protective clothing being protected to the best possible extent on the one hand, and to said user being able to continue to carry out his/her activities in an ideally unimpeded manner on the other hand. In general, potential risk scenarios in which an explosion containing toxic or harmful substances, respectively, can arise can be seen in military conflicts, terror attacks, which are in a constant state of change, accidents, (natural) catastrophes, fires, or the like. The frequency of such risk scenarios associated with the risk of an explosion containing toxic or harmful substances, respectively, and wearing corresponding protective clothing continues to increase, specifically not least by virtue of the increasing number of hot spots bearing the risk of a military conflict, terrorist activities or the like.

In terms of the underlying protective clothing it is also necessary herein that said protective clothing guarantees ideally positive protection (that is to say particularly lasting protection with an ideally wide scope) in relation to toxic or harmful substances, respectively, wherein the protective function has to be guaranteed, for example, in relation to military warfare agents as well as to industrial hazardous materials such as, for example, toxic industrial chemicals (TICs). It is also of great importance herein that the overall system which is to be utilized and which can comprise, for example, an item of protective clothing and a respiratory mask, in its entirety provides a high degree of protective function, wherein the configuration of weak spots, or breaches, respectively, for example at the respective transition or contact locations, respectively, of the corresponding parts of a protective system, such as for example the transition region or the interface, respectively, between a head cover or a headgear, respectively, and a respiratory mask, is also to be avoided in this context.

A critical factor which contributes to the overall protective performance of a corresponding protective protection system is thus to be seen also in the transition region (contact regions), or the interface, respectively, between a headgear such as a hood or the like, on the one hand, and a respiratory mask, in particular a mask body of a respiratory mask, on the other hand. Sub optimal sealing in this transition region between the headgear on the one hand, and the respiratory mask on the other hand, can lead to toxic or harmful substances, respectively, making their way through the not sufficiently sealed transition under the headgear and thus onto the body or the skin, respectively, of a user such that a respective contamination is present and the user comes in contact with said toxic or harmful substances, respectively. Consequently, gaseous or liquid toxic or harmful substances, respectively, such as chemical harmful substances or military warfare agents, respectively, or the like can come in contact with the unprotected skin of a user, this potentially being associated with undesirable and even irreversible injuries or even with the death of the user such that an exposure of this type is to be avoided at all cost.

Against this background, there is thus a great demand in the prior art for providing technical approaches for effectively sealing the transition region of a protective clothing, in particular in the form of a head cover such as a headgear or the like, on the one hand, and a respiratory mask, in particular a mask body of a respiratory mask, on the other hand.

In light of this, there is also a high demand in the prior art for providing corresponding protective clothing, in particular in the form of headgear or the like, which has a high level of adaptability or universality, respectively, in relation to underlying respiratory masks which are present in a great diversity in terms of models and types. Adapting, or bringing to bear, respectively, in a sealing manner a headgear such as a hood, which can likewise be a component part of a protective clothing, to or on a respiratory mask, or on a mask body underlying the respiratory mask, respectively, is difficult to design also because there are a multiplicity of different types are models, respectively, of respiratory masks which can differ from one another in terms of the size or shaping thereof, respectively, or the constructive design thereof, respectively, specifically also in terms of the underlying mask body of the respective respiratory masks. In this context, mutually dissimilar concave or convex regions can be present in the respective mask body, for example, wherein the mask bodies can in each case also have dissimilar circumferences or dimensions, respectively, this representing a great challenge in terms of providing a corresponding protective clothing or headgear, respectively, having a wide scope of application in terms of the multiplicity of underlying types or models of respiratory masks, respectively.

The approaches known in the prior art however do not always lead to optimal sealing in relation to corresponding respiratory masks. Moreover, there is only a limited adaptability in terms of various types of respiratory masks having different physical configuration or shaping, respectively, also of the mask body, such that the scope of application of a hood of this type is at times limited.

DE 103 27 994 A1 as well as the documents according to EP 1 628 713 A1, US 2006/117470 A1 as well as WO 2004/105880 A1 which are all part of the same pattern family relate to a hood which has an encircling elastic seam that delimits a field-of-vision opening which is provided for receiving a respiratory mask, wherein the seam in the applied or worn state, respectively, is to be brought to bear on the respiratory mask. With regard to the latter, an encircling seal which is disposed on the internal side of the seam that points into the field-of vision opening and is provided for bearing on a respiratory mask is provided, wherein the seal can be configured as an annular seal, a seal lip, or a sealing projection, so as to in this way achieve a plurality of linear innovations or height increases, respectively, on the seam. However, a system of this type does not always lead to bearing in an optimal sealing manner on a protective mask, in particular with a view to being used with various types or models, respectively, of respiratory masks.

Alternative sealing concepts of the prior art (such as, for example, DE 10 2012 007 502 A1 and DE 10 2014 106 913 A1) are predominantly adapted to special concepts of respiratory masks and cannot be readily applied to respiratory mask systems of a different type, or cannot be universally used, respectively.

BRIEF SUMMARY OF THE INVENTION

Against this background, the present invention is therefore based on the object of providing an efficient concept for providing sealing of the transition or contact region, respectively, of a headgear which is configured in the form of a hood and/or a balaclava, for example, and a respiratory mask, in particular a mask body of a respiratory mask, wherein the previously discussed disadvantages of the prior art are to be at least largely avoided or else at least alleviated.

In this context, an object of the present invention is in particular to be seen in providing in particular a headgear which can be used or utilized, respectively, for, in, or as protective clothing, in particular ABC protective clothing (CBRN protective clothing), preferably for the civilian and/or defense sector and which possesses improved sealing properties in the region of the transition between the headgear on the one hand, and the respiratory mask on the other hand, wherein said transition is to be at least largely sealed in relation to toxic or harmful substances, respectively, such that an ingress of toxic or harmful substances, respectively, through the transition region under the headgear with respective contact by the wearer or user, respectively, of such a headgear is to be prevented.

Moreover, a further object of the present invention lies in providing a corresponding headgear which has a high degree of adaptability or universality, respectively, in relation to underlying respiratory masks, wherein the headgear is to be able to be used for connecting in a sealing manner the transition region in a multiplicity of different types or models, respectively, of respiratory masks having dissimilar physical shaping. In the context of the present invention, a headgear which is universal so to speak and is able to be used independently of the underlying type of respiratory mask is thus to be provided.

A yet further object of the present invention is also to be seen in providing a corresponding headgear which is improved in terms of the handling thereof and which is to enable quick and uncomplicated donning, or putting on, respectively, while providing in a simple manner a sealing contact, or a sealing connection, respectively, in relation to a respiratory mask.

A yet again further object of the present invention is moreover also to be seen in that the headgear per se is to be universally used with a view to said headgear is to be able to be provided in numerous configurations or shapes, respectively, in particular as a hood or a balaclava, wherein the headgear is also to have a large field of application in terms of said headgear is to be able to be present, or used, respectively, for example per se or else as a fixed or releasable component part of a protective clothing, such as a protective suit or a protective jacket.

In order for the object set forth above to be achieved, the present invention according to a first aspect of the present invention thus proposes the headgear (cover) according to the invention, in particular in the form of a hood or a balaclava, preferably for protective clothing, in particular ABC protective clothing, preferably for the civilian or defense sector, respectively. Further advantageous refinements and design embodiments of this aspect of the invention relating to the headgear according to the invention are also disclosed.

A further subject matter of the present invention according to a second aspect of the present invention is moreover the use of the headgear according to the invention for or as protective clothing, or as a component of component part of protective clothing, respectively, preferably for the civilian or defense sector, respectively.

A yet further subject matter of the present invention according to a third aspect of the present invention is moreover also the item of protective clothing, in particular the item of ABC protective clothing, preferably for the civilian or defense sector, respectively, which comprises the headgear according to the invention, or is produced while using said headgear, respectively.

Yet another further subject matter of the present invention according to a fourth aspect of the present invention is moreover the use of a sealing element in combination with a peripheral portion, or the use of a combination of a sealing element as well as of a peripheral portion, respectively, for sealing the transition between a headgear and a respiratory mask.

Finally, a further subject matter of the present invention according to a fifth aspect of the present invention is also the method for sealing the transition between a headgear and a respiratory mask.

It goes without saying that in the description hereunder of the present invention those design embodiments, embodiments, advantages, examples, or the like which hereunder for the purpose of avoiding unnecessary repetitions are set forth only in the context of a single aspect of the invention of course do also apply in an analogous manner to the other aspects of the invention, without this requiring any explicit mention.

With a view to the description hereunder of the present invention it is also to be understood in such a manner that the features of the present invention set forth in each case in the context with the special design embodiments, embodiments, advantages, examples are also considered disclosed in the combination thereof. Superordinate and subordinate combinations of individual or a plurality of features or groups of features which are set forth for respective design embodiments, embodiments, exemplary applications or the like thus are presently also considered to be disclosed.

It furthermore goes without saying that the respective indications of values, numbers, and ranges in the indications of values, numbers and ranges hereunder are not to be understood as limiting; it is self-evident to the person skilled in the art that the stated ranges or indications, respectively, may be deviated from in the individual case or application without departing from the scope of the present invention.

It moreover applies that all indications of values or parameters, respectively, or the like, mentioned hereunder can be established or determined in principle, respectively, by normalized standardized or explicitly stated determination methods, or else be established or determined, respectively, with determination or measuring methods, respectively, which are familiar to the person skilled in the art in this field. Unless otherwise stated, the underlying values or parameters, respectively, are determined at standard conditions (i.e. in particular at a temperature of 20° C. and/or at a pressure of 1,031.25 hPa, or 1.01325 bar, respectively).

It moreover applies that it is to be noted in the case of all indications of relative or percentage-wise quantities, in particular weight-related quantities, set forth hereunder that said indications in the context of the present invention are to be selected or combined, respectively, by the person skilled in the art in such a manner that a sum of 100% or 100% by weight, respectively, results at all times, optionally while including further components or ingredients, in particular as defined hereunder. However, this is self-evident to the person skilled in the art.

For purposes of visualizing the present invention, the reference signs set forth in the figures are also resorted to in the description hereunder of the subject matter according to the invention; the use of the reference signs in this context herein is purely illustrative and is not associated with any kind of restriction in terms of the subject matter according to the invention.

With the above having been established, the present invention will be described in more detail hereunder.

DETAILED DESCRIPTION OF THE INVENTION

Figure 1:
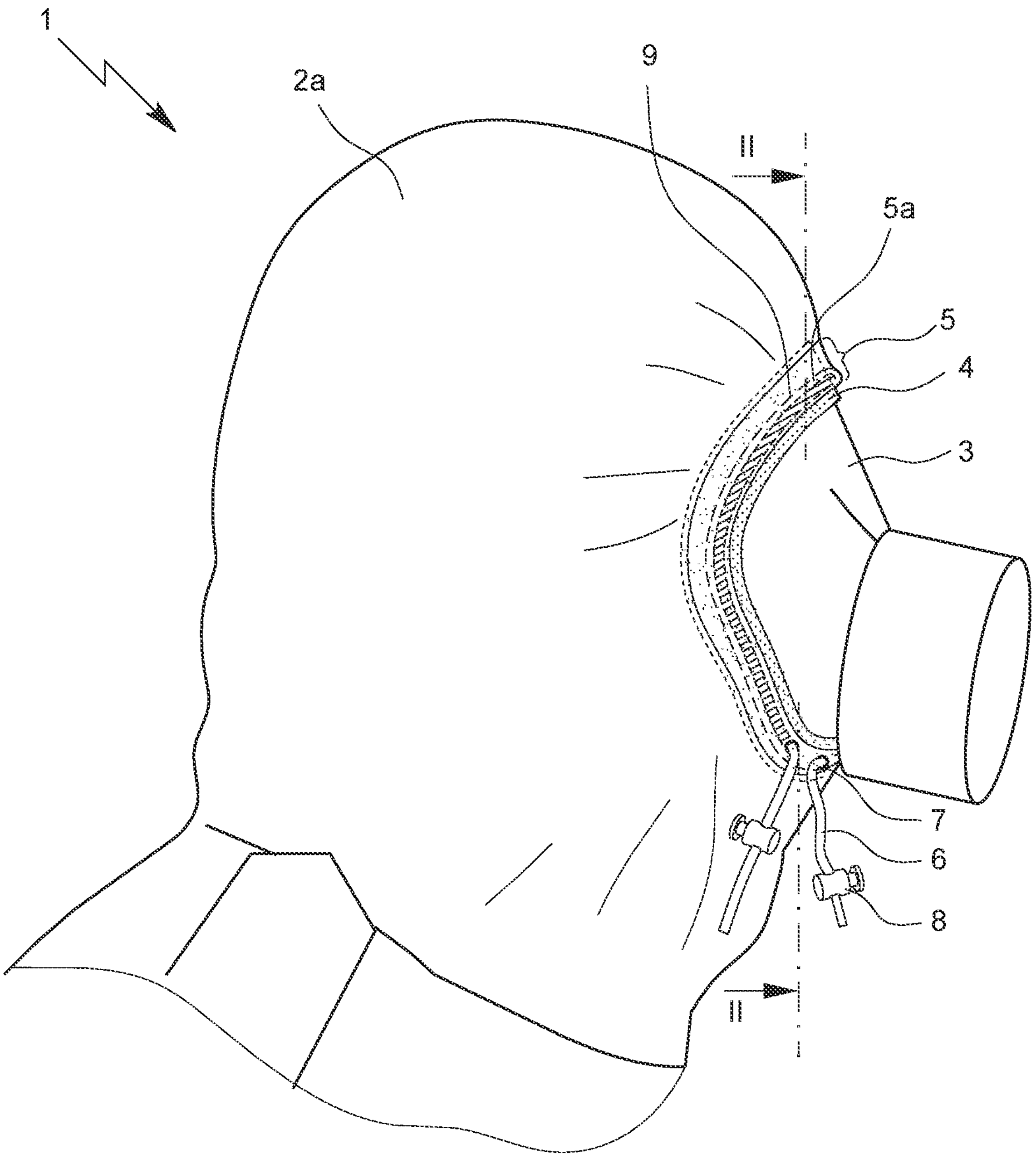
FIG. 1 shows a schematic lateral view of a headgear according to the invention in the worn and/or applied state having the respective sealing of the peripheral region of a respiratory mask.

According to a first aspect of the present invention, the subject matter of the present invention is thus a headgear (synonymously also referred to as a cover), in particular in the form of a hood or a balaclava, preferably for protective clothing, in particular ABC protective clothing (CBRN protective clothing), preferably for the civilian and/or defense sector, wherein the headgear has a cap body (main portion) for covering the head and a field-of-vision opening for receiving and peripherally covering a respiratory mask, wherein the headgear in the region of the field-of-vision opening moreover has:

- a preferably elastic and/or reversibly elongatable sealing element for bearing on a preferably sealing manner on the respiratory mask, wherein the sealing element is disposed and/or provided in an encircling manner in the peripheral region of the field-of-vision opening, and/or wherein the sealing element in an encircling manner peripherally delimits the headgear in relation to the field-of-vision opening, wherein the sealing element, in particular the face (sealing face) of the sealing element that in the worn and/or applied state bears on the respiratory mask, is configured so as to be at least substantially flat, in particular in the shape of a tape or a strip, and/or wherein the sealing element, in particular the face (sealing face) of the sealing element bearing on the respiratory mask, in the worn and/or applied state bears, or is configured so as to bear, so as to be at least substantially flat, in particular in the shape of a tape or a strip, on the respiratory mask; and
- a peripheral portion which on the exterior (external side) and/or on the side of the sealing element that faces away from the field-of-vision opening has a peripheral portion which at least partially covers and/or overlaps the sealing element, wherein the peripheral portion is provided with a tie element, and/or wherein the peripheral portion is assigned a tie element such that the peripheral portion is configured so as to push and/or be tensioned against the sealing element from the exterior and/or on the external side and/or in the direction of the field-of-vision opening, in particular so as to on account thereof push and/or bring to bear the sealing element onto/on the respiratory mask in the worn and/or applied state.

A central concept of the present invention is thus to be seen in particular in providing a headgear having a special configuration of the region that delimits the field-of vision-opening, on account of which specifically a special sealing element on the one hand, and a peripheral portion which by way of a respective tie element is variably adjustable, on the other hand, interacts so to speak with a view to effectively sealing the transition region, or the interface, respectively, to a respiratory mask, in particular a protective body of the mask of a respiratory mask.

It is the case according to the invention herein in particular that the sealing element in the worn and/or applied state peripherally bears on the respiratory mask, or on the mask body of the respiratory mask, respectively, so as to be in particular encircling along the field-of-vision opening, wherein an additional effect of force, or further contact pressure of the sealing element on the respiratory mask, or the mask body of a respiratory mask, is caused or effected, respectively, on account of the peripheral portion having the variably adjustable tie element such that overall efficient sealing of the transition between the headgear (specifically in the peripheral region of the headgear toward the field-of-vision opening) and a respiratory mask, in particular a mask body of a respiratory mask, is guaranteed according to the invention. It is the case according to the invention herein in particular that the sealing element peripherally bearing on the respiratory mask, on account of the individually adjustable peripheral portion having the respective tie element, bears on the respiratory mask, or the respective mask body, respectively, with a greater (contact) pressure, or is tensioned toward the respiratory mask with a greater force, respectively.

In the context of the present invention herein, are high degree of adaptability or universality, respectively, of the provided headgear in terms of receiving or sealing, respectively, a multiplicity of different types of respiratory masks is also guaranteed, said different types of respiratory masks differing in terms of their shape or construction, respectively, in particular also in terms of the configuration of the respective mask body, wherein a high degree of variability is present in this respect. The headgear according to the invention can thus be used for a large multiplicity of commercially available respiratory masks.

Furthermore, simple handling, or an improved application capability according to the invention, respectively, of the headgear according to the invention is also guaranteed since said headgear can be brought to bear or placed, respectively, in a simple manner, on the one hand, and simple handling in terms of the setting, or the activation, of the tie element of the peripheral portion is guaranteed, on the other hand, such that the headgear in the region of the field-of vision opening can be adapted to, or placed in a sealing manner on, respectively, an underlying mask body in a rapid and simple manner.

Moreover, the sealing connection provided between the headgear on the one hand and the respiratory mask, or the mask body, respectively, on the other hand is free of slippage such that a reliable and permanent fit, or reliable sealing, respectively, in relation to a respiratory mask is guaranteed even under such conditions of use which are associated with an increased level of physical activity, or with increased movement of the user (wearer).

As a result, the headgear provided according to the invention thus offers an even more improved protection of the transition to a respiratory mask together with increased ease of handling, or application, respectively, of the headgear per se.

Moreover, the headgear according to the invention per se can also be individually configured, or taylor made, or individually adapted, respectively, against the background of the respective purpose of use or application, respectively, and herein be present as a hood or a balaclava, for example. The headgear according to the invention, for example as a hood or a balaclava, respectively, can be configured or used per se, respectively, as stand-alone protective clothing or else as a fixed or releasable, respectively, component part of a protective clothing, or else as an in particular fixedly integrated hood of a protective jacket of a protective suit or the like, as is yet to be set forth hereunder.

In the context of the present invention herein it is in particular the case that the peripheral portion having the corresponding tie element is disposed on the outside, or above, the sealing element in terms of a respiratory mask disposed in the worn and/or applied state of the headgear is disposed below the sealing element, and specifically in particular preferably in an encircling manner along the peripheral region toward the field-of-vision opening of the headgear, wherein the sealing element in turn bears in particular directly on a peripheral region of the respiratory mask, or of the corresponding mask body, respectively.

According to the invention it is thus in particular the case that the peripheral portion having the tie element in the worn and/or applied state is positioned on the side of the sealing element that faces away from the protective mask and/or the field-of-vision opening.

The circumference, or the length, respectively, of the peripheral portion can be reduced or set, respectively, by way of the tie element integrated in the peripheral portion such that the peripheral portion by way of the tie element is pushed onto the sealing element which in turn leads to the sealing element being more intensely pushed, or tensioned, against the respiratory mask, or the mask body, respectively, specifically in a uniform manner along, or encircling, respectively, the field-of vision-opening.

Efficient peripheral sealing of a respiratory mask, or of a respective respiratory mask body, respectively, is thus overall enabled according to the invention, specifically by way of a high degree of individual adaptability, or adaptation, respectively, in terms of different types of respiratory masks.

According to the invention it is thus in particular also the case that the region of the peripheral portion which so to speak at least partially covers or overlaps, respectively, the sealing element from above, or from the outside, respectively, by way of the respective tie element is freely positionable on the sealing element, or so as to be unconnected on the latter, respectively. According to the invention, this is in particular enabled in that the peripheral portion having the tie element on the one hand, and the sealing element on the other hand, are in each case individually configured, so to speak, this leading to a displacement of the sealing element in relation to the respiratory mask, or the mask body, respectively, to be sealed being avoided when correspondingly setting the peripheral portion by way of the tie element and decreasing the circumference or the length, respectively, of the peripheral portion in conjunction with the former.

The peripheral region having the tie element on the one hand, and the sealing element on the other hand, are therefore independent systems so to speak to the extent that the tie element is received by the peripheral region and said tie element per se is not in direct contact with the sealing element, wherein the tie element, as will yet be explained hereunder, is in particular integrated in a special cavity, or tunnel, respectively, of the peripheral portion and is thus not integrated in the peripheral portion. Consequently, the tie element, in the activation or displacement thereof, respectively, in the peripheral portion does not rub directly on the sealing element, this counteracting a formation of creases in the sealing element together with the potential creation of breaches in the transition region to the respiratory mask. By virtue of the special construction according to the invention, the peripheral portion having the tie element on the one hand, and the sealing element on the other hand, herein functionally interact to the extent that the sealing element as a result of the activation of the tie element is furthermore pushed onto the respiratory mask, or is brought to bear on the respiratory mask with additional pressure, respectively by the peripheral portion. On account of the tie element being separately guided in the peripheral portion while avoiding any direct contact between the tie element on the one hand and the sealing element on the other hand, creasing by the sealing element, or damage or excessive stress, respectively, to the sealing element is avoided.

According to the invention, preferably sealing and slippage-free bearing of the sealing element in the peripheral region of a respiratory mask, or of a mask body, respectively is thus overall enabled such that the ingress of toxic or harmful substances through the transition region between the headgear on the one hand and the respiratory mask on the other hand is effectively reduced or suppressed, respectively, this consequently leading to a further improvement in terms of the overall protective function of the underlying cover, or of a respective protective clothing, respectively.

The term “sealing” or “seal”, respectively, as is used according to the invention in particular with a view to the transition region, or the interface, respectively, between the headgear on the one hand and the peripheral region of a respiratory mask, or of a mask body, respectively, on the other hand is to be very loosely interpreted in the overall context of the present invention and relates in particular to the prevention, or at least to the sustainable reduction, respectively, of the ingress, or the invasion, respectively, of gases, vapors, aerosols, or liquids, respectively, in particular of toxic or harmful substances, respectively (hazardous materials, warfare agents, or the like) in the transition region, of the interface region, respectively, between the headgear on the one hand and the respiratory mask on the other hand.

Furthermore, the term “hood” as used according to the invention is also to be very loosely interpreted. The term in question relates in particular to such head coverings, or configurations of the headgear, respectively, which in the worn and/or applied state at least partially cover the head, wherein covering of the nape as well as optionally partial covering of the shoulders and optionally of the upper back and/or of the upper chest region can optionally also exist.

The term “balaclava” as is used according to the invention is likewise to be very loosely interpreted. A balaclava (synonymously also referred to as a storm cap, storm mask, pullover cap, or the like) herein is in particular configured in such a manner that said balaclava in the worn and/or applied state covers at least substantially the entire head as well as the neck or nape, respectively, wherein the face is exposed or not covered, respectively.

According to the invention it is moreover generally the case that the headgear according to the invention has an encircling peripheral region for forming a field-of-vision opening through which parts or portions (regions), respectively, of the respiratory mask protrude, so to speak, in the worn and/or applied state wherein this here is in particular the corresponding peripheral region of a underlying mask body of a respiratory mask. The peripheral region herein, which in particular according to the invention is formed by the sealing element as well as the peripheral portion having the respective tie element, in the worn and/or applied state is intended to bear in a sealing manner on the respiratory mask, or the mask body, respectively.

A further subject matter of the present invention according to a further aspect of the present invention is moreover the use of the headgear according to the invention as defined above in, for, or as protective clothing, or as a component or component part of protective clothing, respectively, in particular ABC protective clothing (CBRN protective clothing), preferably for the civilian and/or defense sector.

A subject matter of the present invention according to vet a further aspect of the present invention is moreover the item of protective clothing according to the invention, in particular the item of ABC protective clothing (item of CBRN protective clothing), preferably for the civilian and/or defense sector, having or comprising, respectively, a headgear as defined according to the invention, or produced while using a headgear as defined according to the invention, respectively.

A further subject of the matter of the present invention according to an even further aspect of the present invention is moreover the use according to the invention of a sealing element in combination with a peripheral portion, or the use of a combination of a sealing element as well as a peripheral portion for sealing the transition between a headgear (cover), in particular as defined according to the invention, preferably in the form of a hood or a balaclava, preferably for protective clothing, in particular ABC protective clothing (CBRN protective clothing), preferably for the civilian and/or defense sector, and of a respiratory mask, wherein a headgear having a cap body (main portion) for covering the head and a field-of-vision opening for receiving and peripherally covering a headgear comprising a respiratory mask in the region of the field-of-vision opening is moreover provided with:

a preferably elastic and/or reversibly elongatable sealing element for bearing in a preferably sealing manner on the respiratory mask, wherein the sealing element is disposed and/or provided in an encircling manner in the peripheral region of the field-of-vision opening, and/or wherein the sealing element in an encircling manner peripherally delimits the headgear in relation to the field-of-vision opening, wherein the sealing element, in particular the face (sealing face) of the sealing element that in the worn and/or applied state bears on the respiratory mask, is configured so as to be at least substantially flat, in particular in the shape of a tape or a strip, and/or wherein the sealing element, in particular the face (sealing face) of the sealing element bearing on the respiratory mask, in the worn and/or applied state bears, or is configured so as to bear, so as to be at least substantially flat, in particular in the shape of a tape or a strip, on the respiratory mask; and a peripheral portion which on the exterior (external side) and/or on the side of the sealing element that faces away from the field-of-vision opening has a peripheral portion which at least partially covers and/or overlaps the sealing element, wherein the peripheral portion is provided with a tie element, and/or wherein the peripheral portion is assigned a tie element such that the peripheral portion is configured so as to push and/or be tensioned against the sealing element from the exterior and/or on the external side and/or in the direction of the field-of-vision opening, in particular so as to on account thereof push and/or bring to bear the sealing element onto/on the respiratory mask in the worn and/or applied state.

Finally, the present invention according to a vet again further aspect of the present invention also relates to the method for sealing the transition between a headgear (cover), in particular as defined above, preferably in the form of a hood or a balaclava, preferably for protective clothing, in particular ABC protective clothing (CBRN protective clothing), preferably for the civilian and/or defense sector, and a respiratory mask, in particular while using a sealing element in combination with a peripheral portion and/or in particular while using a combination of a sealing element as well as a peripheral region; wherein a headgear having a cap body (main portion) for covering the head and a field-of-vision opening for receiving and peripherally covering a respiratory mask in the region of the field-of-vision opening is moreover provided with:

a preferably elastic and/or reversibly elongatable sealing element for bearing in a preferably sealing manner on the respiratory mask, wherein the sealing element is disposed and/or provided in an encircling manner in the peripheral region of the field-of-vision opening, and/or wherein the sealing element in an encircling manner peripherally delimits the headgear in relation to the field-of-vision opening, wherein the sealing element, in particular the face (sealing face) of the sealing element that in the worn and/or applied state bears on the respiratory mask, is configured so as to be at least substantially flat, in particular in the shape of a tape or a strip, and/or wherein the sealing element, in particular the face (sealing face) bearing on the respiratory mask of the sealing element, in the worn and/or applied state bears, or is configured so as to bear, so as to be at least substantially flat, in particular in the shape of a tape or a strip, on the respiratory mask; and a peripheral portion which on the exterior (external side) and/or on the side of the sealing element that faces away from the field-of-vision opening has a peripheral portion which at least partially covers and/or overlaps the sealing element, wherein the peripheral portion is provided with a tie element, and/or wherein the peripheral portion is assigned a tie element such that the peripheral portion is configured so as to push and/or be tensioned against the sealing element from the exterior and/or on the external side and/or in the direction of the field-of-vision opening, in particular so as to on account thereof push and/or bring to bear the sealing element onto/on the respiratory mask in the worn and/or applied state.

The present invention will be explained in more detail hereunder by means of preferred exemplary embodiments, or by drawings or illustrations in figures, respectively, illustrating embodiments, respectively. Further advantages, properties, aspects and features of the present invention will also become apparent in connection with the description of these preferred embodiments of the present invention which, however, shall in no way limit the present invention.

Figure 2:
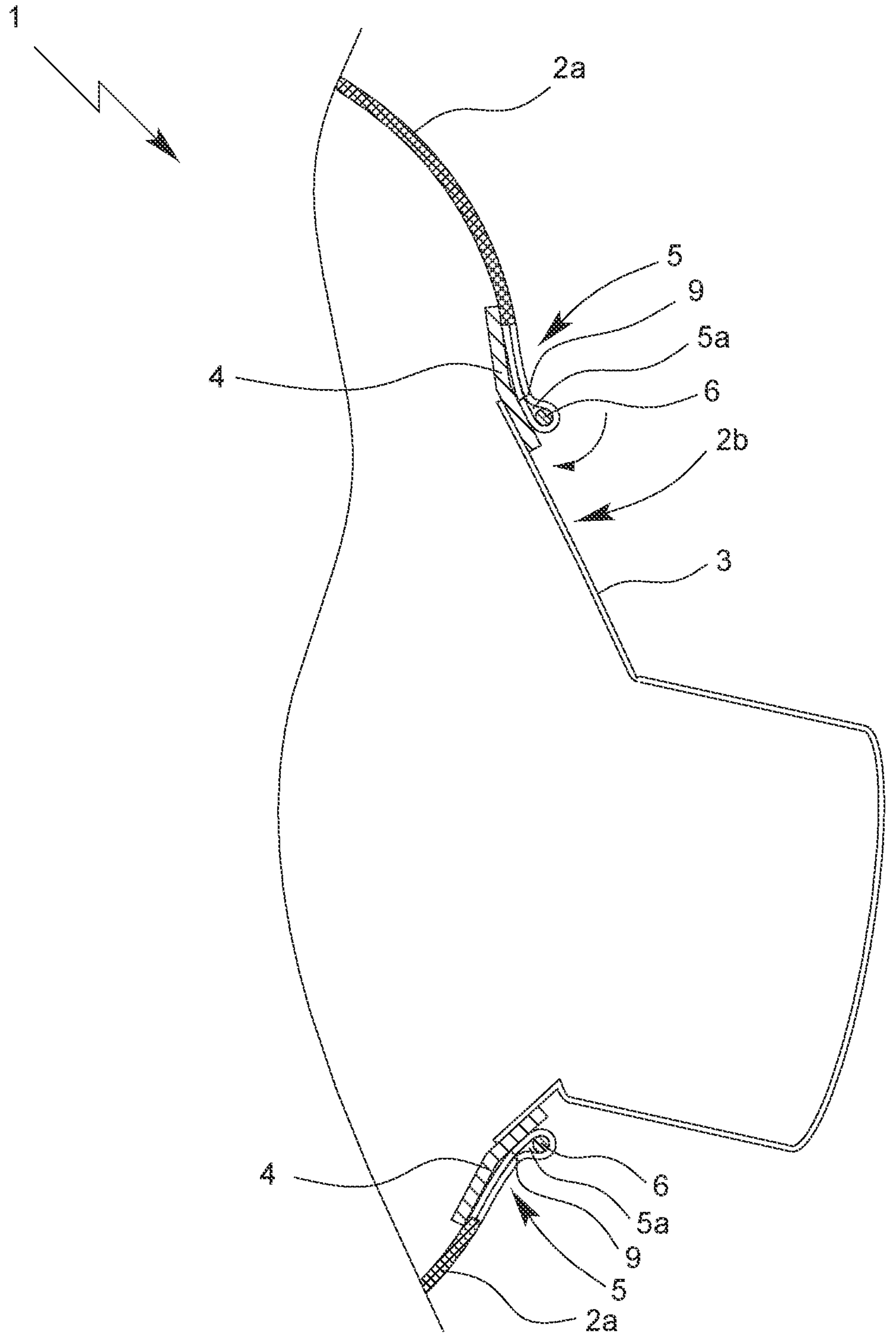
FIG. 2 shows an enlarged cross-sectional illustration along the line II illustrated in FIG. 1, wherein the peripheral portion is tensioned by the tie element and bears externally on the sealing element such that the sealing element is additionally pushed against the peripheral region of the respiratory mask.
Figure 3:
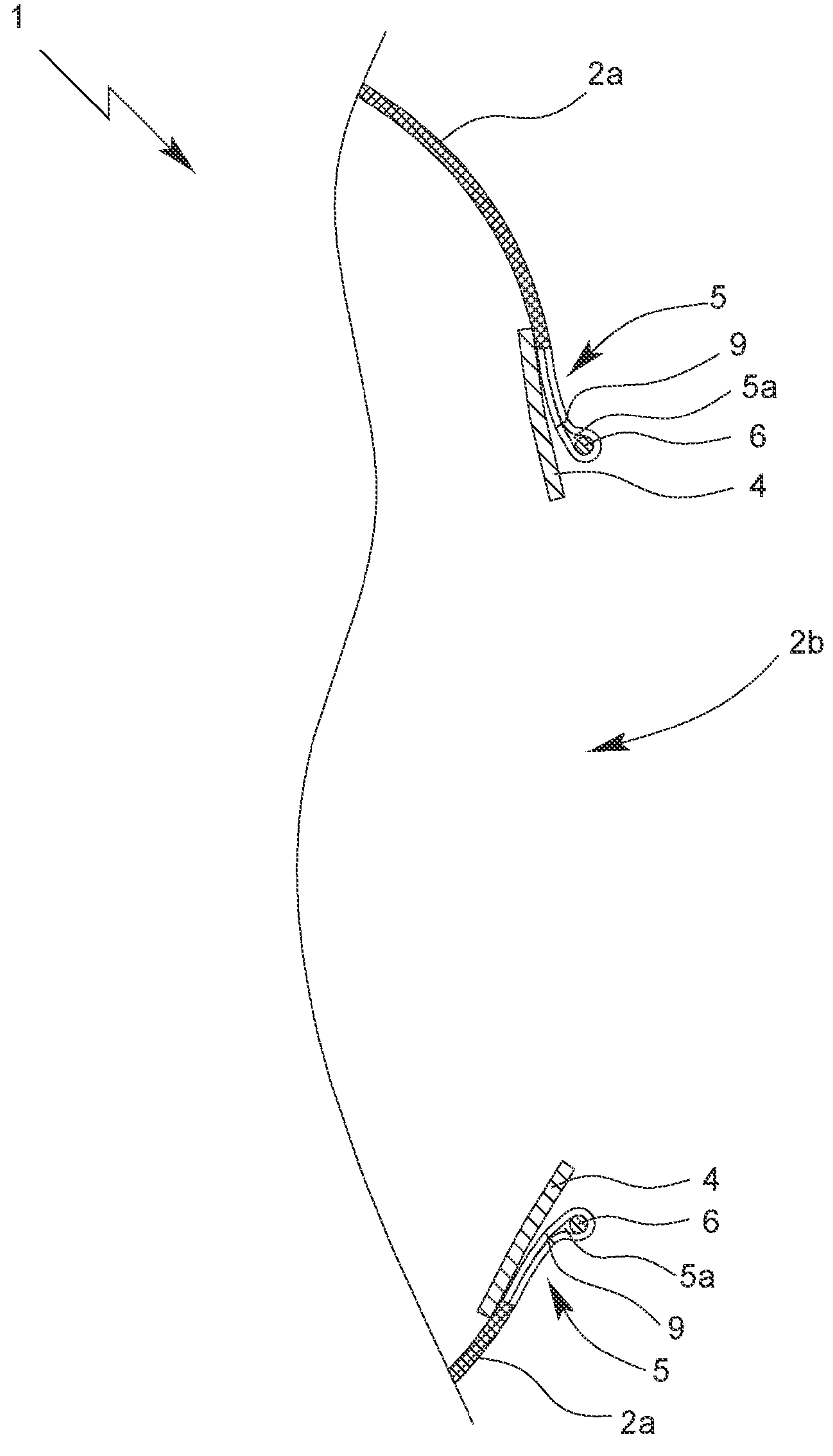
FIG. 3 shows a schematic cross section of the peripheral regions delimiting a field-of-vision opening of a headgear according to the invention, having the respective arrangement of the sealing element as well as of the peripheral portion having the tie element, wherein the headgear is not in the worn and/or applied state and wherein the peripheral portion is not tensioned by the tie element.
Figure 4A:
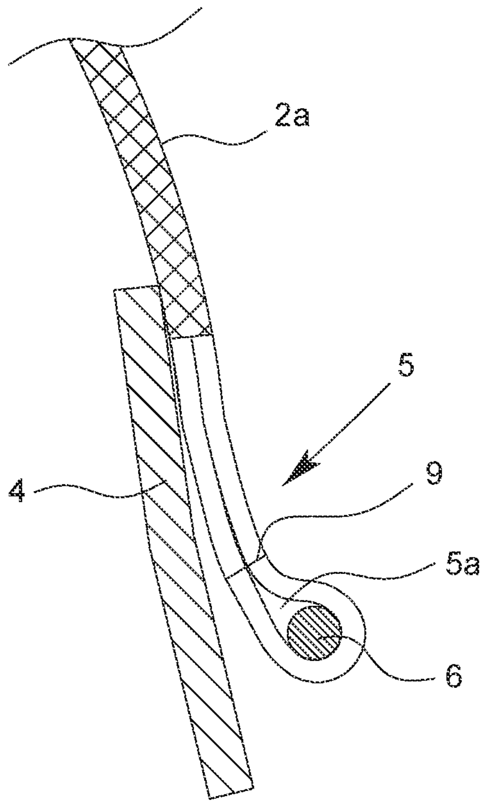
FIG. 4A shows a further enlarged cross-sectional illustration of the peripheral region of a headgear according to the invention that delimits the field-of-vision opening, having the sealing element as well as the peripheral portion which adjoins the cap body and has the integrated tie element, wherein the headgear is not in the worn or applied state, respectively.
Figure 4B:
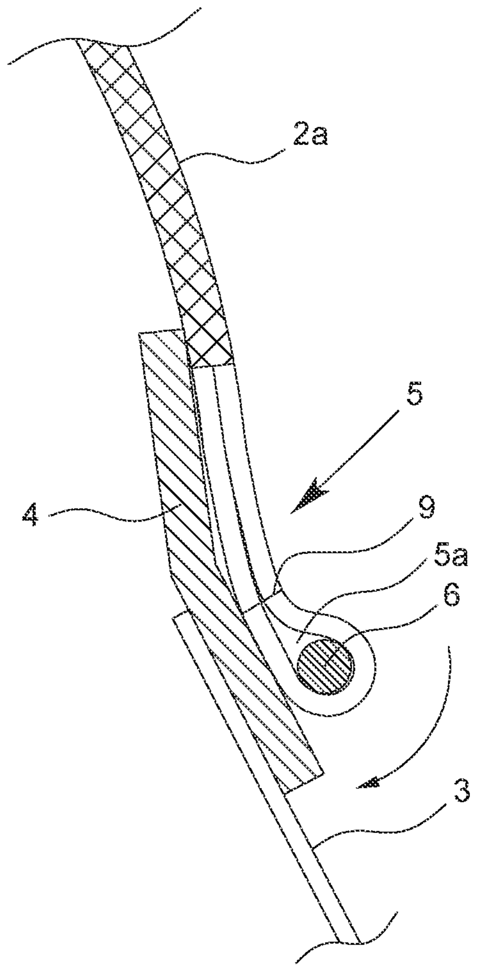
FIG. 4B shows a further enlarged cross-section illustration of the peripheral region of a headgear according to the invention that delimits the field-of-vision opening, having the sealing element as well as peripheral portion which adjoins the cap body and has the respective tie element, wherein the headgear is in the worn and/or applied state and wherein the sealing element is additionally pushed, or tensioned, respectively, against the peripheral region of a respiratory mask by the peripheral portion which is tensioned by the tie element.
Figure 5A:
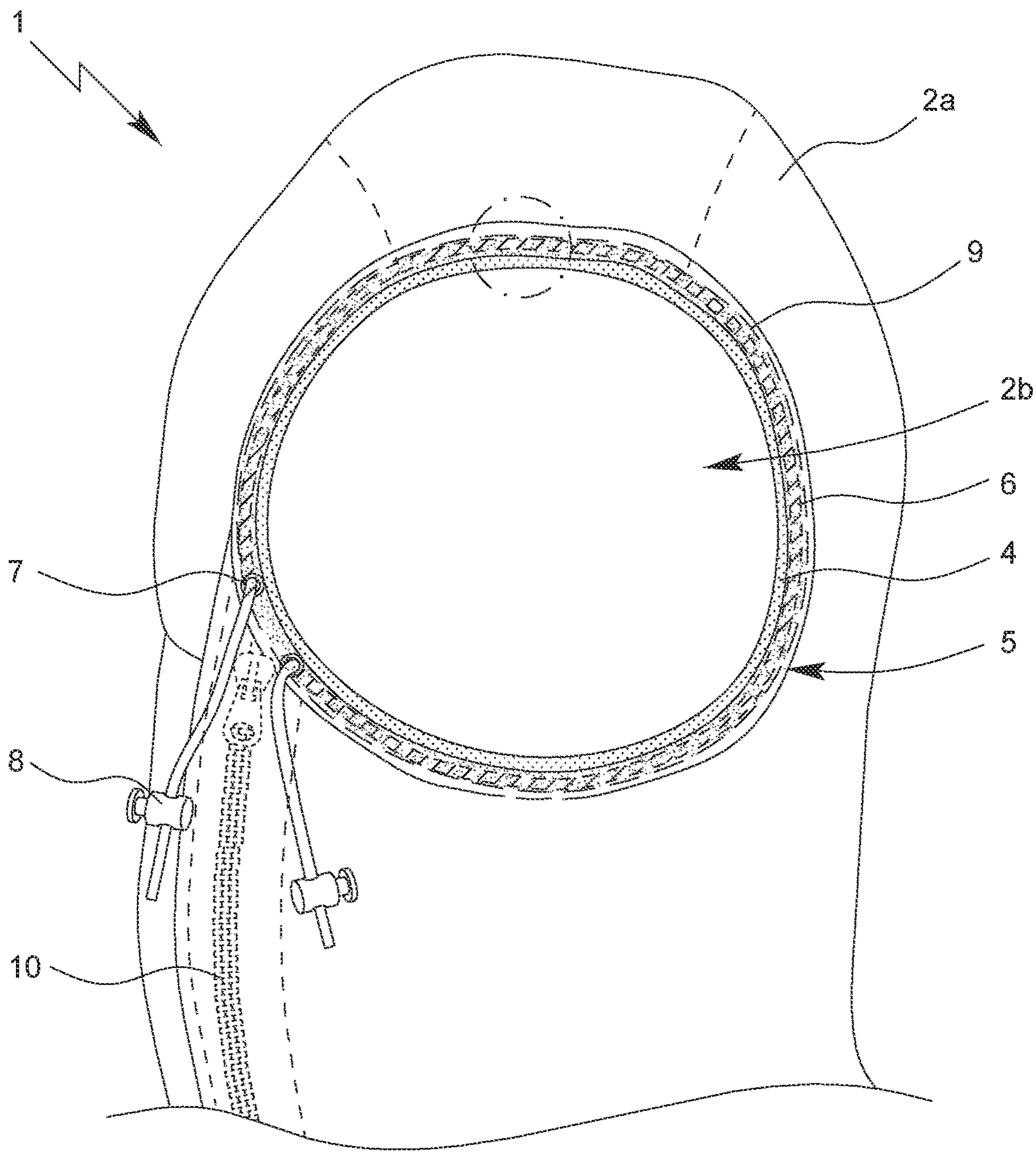
FIG. 5A shows a schematic illustration of a headgear according to the invention in the plan view or frontal view, respectively, wherein the headgear is not in the applied or worn state, respectively, and has an exposed field-of-vision opening.
Figure 5B:
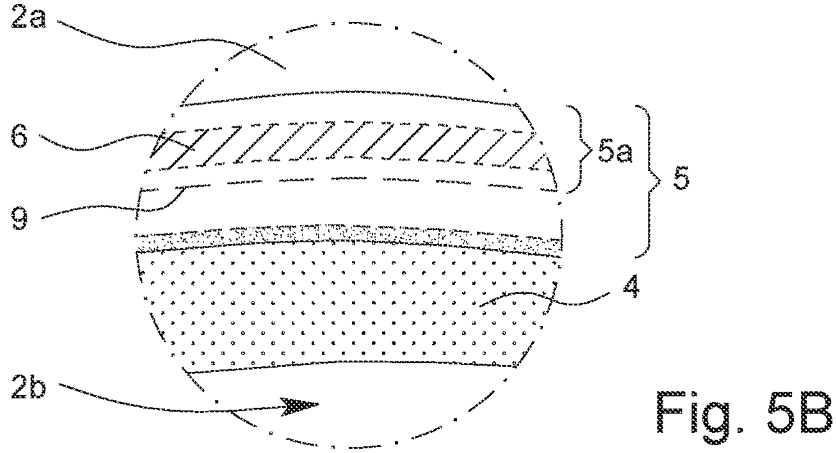
FIG. 5B shows an enlarged fragment of the peripheral region of the headgear marked in FIG. 5A, having a visualizing arrangement or positioning, respectively, of the peripheral portion having the tie element on the one hand, and of the sealing element on the other hand, wherein the peripheral portion having the tie element is spaced apart from the sealing element, or projects therefrom, or is folded outward or upward so to speak, respectively.
Figure 6A:
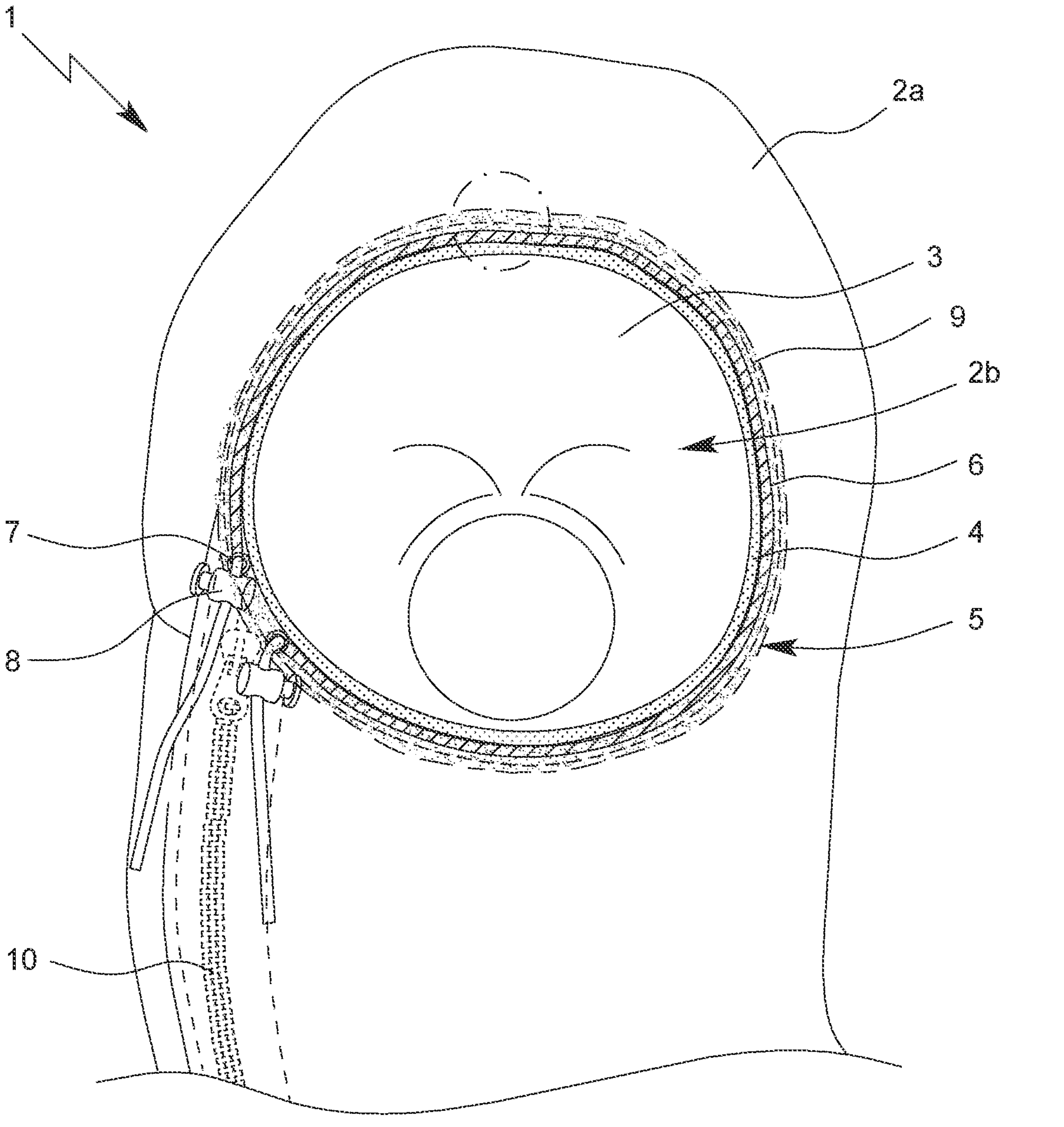
FIG. 6A shows a schematic illustration of a headgear according to the invention in the plan view or frontal view, respectively, wherein the headgear is in the applied or worn state, respectively, and on account of which the headgear seals the peripheral region of a received respiratory mask, wherein the respiratory mask fills the region of the field-of-vision opening, or is received by the field-of-vision opening, respectively.
Figure 6B:
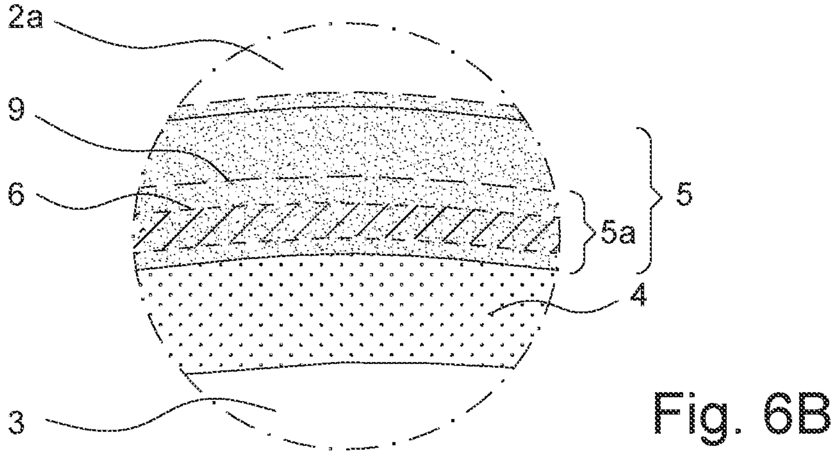
FIG. 6B shows a further enlarged fragment of the peripheral region marked in FIG. 6A, on account of which the peripheral portion having the tie element bears on the sealing element, and on account of which the sealing element is further pushed, or brought to bear, respectively, on the peripheral region of the respiratory mask.
Figure 7:
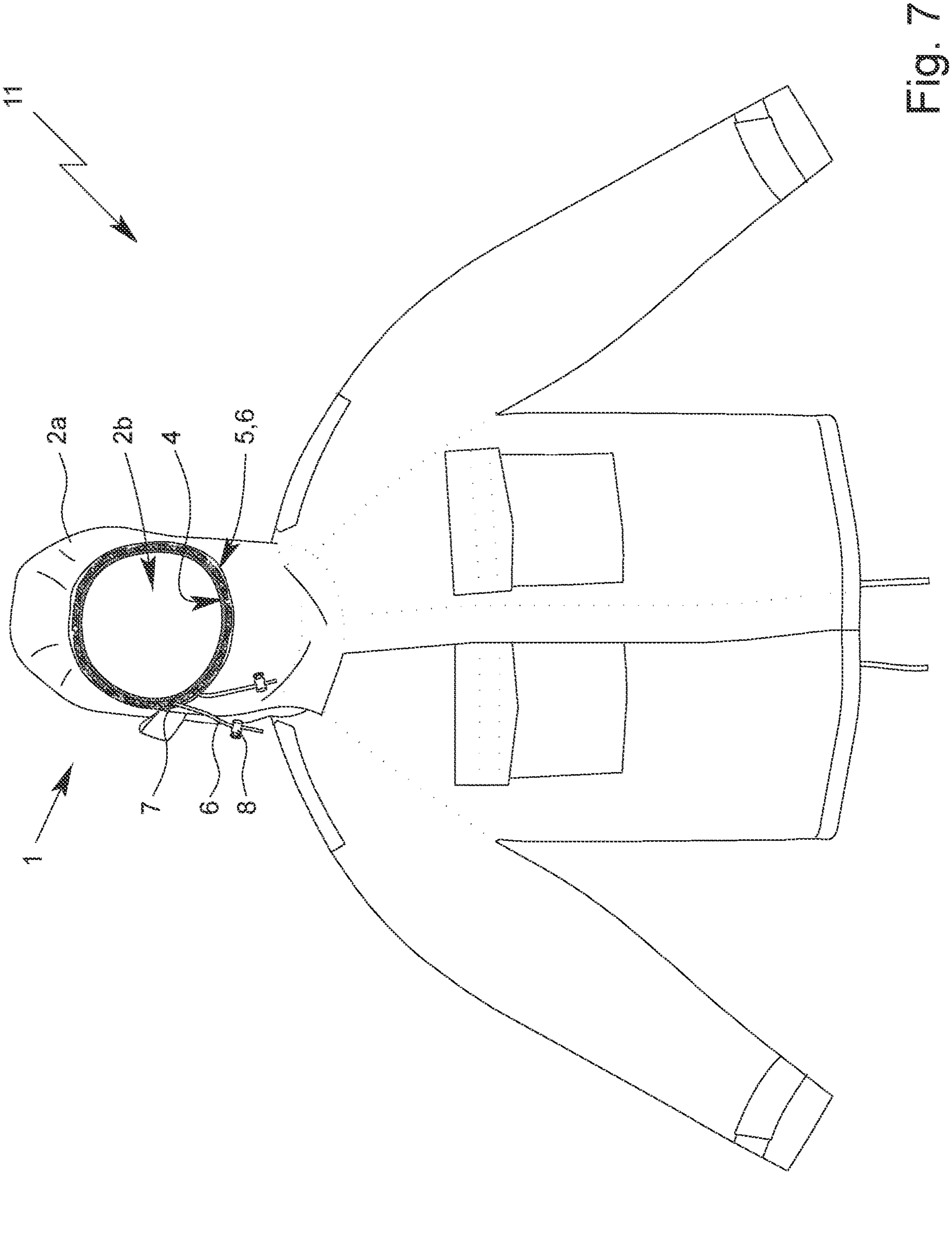
FIG. 7 shows a schematic illustration of a protective suit according to the invention in the form of a protective jacket which has the headgear according to the invention as a fixed or integrated component part, respectively.
Figure 8A:
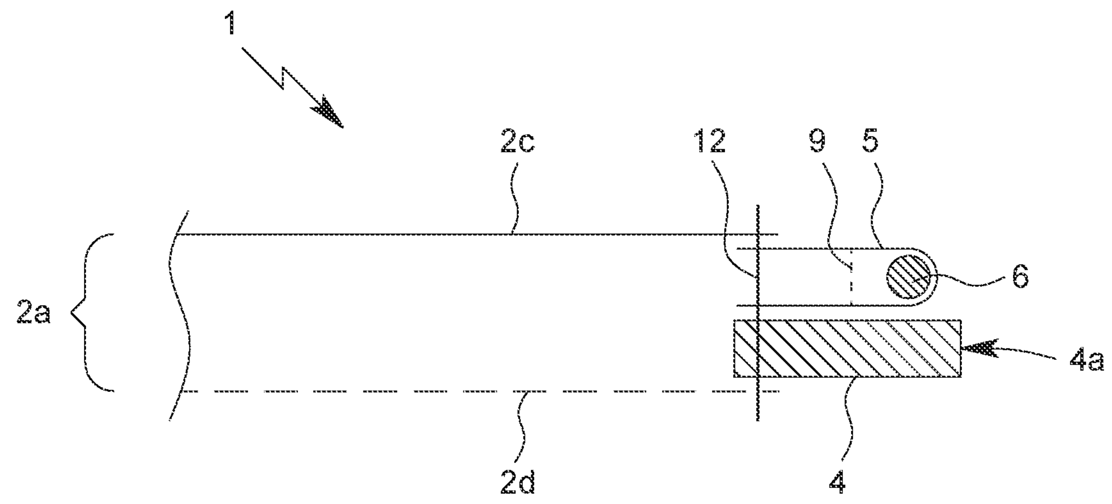
FIG. 8A shows a schematic cross-sectional illustration of the peripheral region of a headgear according to the invention toward the field-of-vision opening, wherein the headgear, or the cap body, respectively, comprises a first (outer) textile material and a second (inner) textile material, having an arrangement of the peripheral portion having the tie element on the one hand, and the sealing element configured so as to be overall flat on the other hand, according to a first embodiment.
Figure 8B:
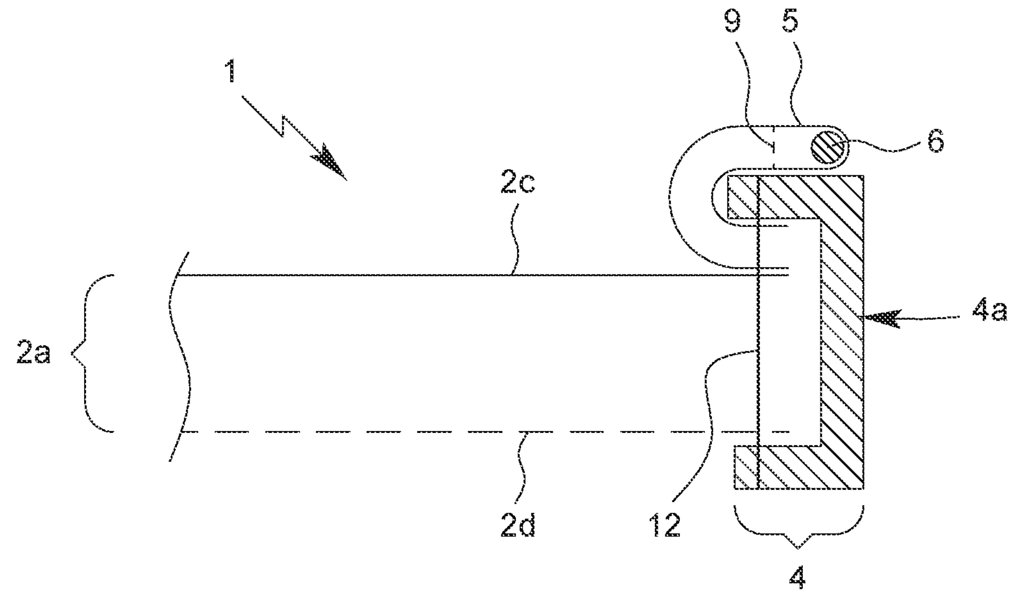
FIG. 8B shows a further schematic cross-sectional illustration of the peripheral region of a headgear according to the invention toward the field-of-vision opening, wherein the headgear, or the cap body, respectively, comprises a first (outer) textile material and a second (inner) textile material, having a respective arrangement of the peripheral portion having the tie element on the one hand, and the sealing element on the other hand according to a further embodiment, wherein the sealing member of the sealing element is configured so as to be U-shaped.

In the illustrations of the figures:

FIG. 1 shows a schematic lateral view of a headgear according to the invention in the worn and/or applied state having the respective sealing of the peripheral region of a respiratory mask;

FIG. 2 shows an enlarged cross-sectional illustration along the line II illustrated in FIG. 1, wherein the peripheral portion is tensioned by the tie element and bears externally on the sealing element such that the sealing element is additionally pushed against the peripheral region of the respiratory mask;

FIG. 3 shows a schematic cross section of the peripheral regions delimiting a field-of-vision opening of a headgear according to the invention, having the respective arrangement of the sealing element as well as of the peripheral portion having the tie element, wherein the headgear is not in the worn and/or applied state and wherein the peripheral portion is not tensioned by the tie element;

FIG. 4A shows a further enlarged cross-sectional illustration of the peripheral region of a headgear according to the invention that delimits the field-of-vision opening, having the sealing element as well as the peripheral portion which adjoins the cap body and has the integrated tie element, wherein the headgear is not in the worn or applied state, respectively;

FIG. 4B shows a further enlarged cross-section illustration of the peripheral region of a headgear according to the invention that delimits the field-of-vision opening, having the sealing element as well as peripheral portion which adjoins the cap body and has the respective tie element, wherein the headgear is in the worn and/or applied state and wherein the sealing element is additionally pushed, or tensioned, respectively, against the peripheral region of a respiratory mask by the peripheral portion which is tensioned by the tie element;

FIG. 5A shows a schematic illustration of a headgear according to the invention in the plan view or frontal view, respectively, wherein the headgear is not in the applied or worn state, respectively, and has an exposed field-of-vision opening;

FIG. 5B shows an enlarged fragment of the peripheral region of the headgear marked in FIG. 5A, having a visualizing arrangement or positioning, respectively, of the peripheral portion having the tie element on the one hand, and of the sealing element on the other hand, wherein the peripheral portion having the tie element is spaced apart from the sealing element, or projects therefrom, or is folded outward or upward so to speak, respectively;

FIG. 6A shows a schematic illustration of a headgear according to the invention in the plan view or frontal view, respectively, wherein the headgear is in the applied or worn state, respectively, and on account of which the headgear seals the peripheral region of a received respiratory mask, wherein the respiratory mask fills the region of the field-of-vision opening, or is received by the field-of-vision opening, respectively;

FIG. 6B shows a further enlarged fragment of the peripheral region marked in FIG. 6A, on account of which the peripheral portion having the tie element bears on the sealing element, and on account of which the sealing element is further pushed, or brought to bear, respectively, on the peripheral region of the respiratory mask;

FIG. 7 shows a schematic illustration of a protective suit according to the invention in the form of a protective jacket which has the headgear according to the invention as a fixed or integrated component part, respectively;

FIG. 8A shows a schematic cross-sectional illustration of the peripheral region of a headgear according to the invention toward the field-of-vision opening, wherein the headgear, or the cap body, respectively, comprises a first (outer) textile material and a second (inner) textile material, having an arrangement of the peripheral portion having the tie element on the one hand, and the sealing element configured so as to be overall flat on the other hand, according to a first embodiment; and FIG. 8B shows a further schematic cross-sectional illustration of the peripheral region of a headgear according to the invention toward the field-of-vision opening, wherein the headgear, or the cap body, respectively, comprises a first (outer) textile material and a second (inner) textile material, having a respective arrangement of the peripheral portion having the tie element on the one hand, and the sealing element on the other hand according to a further embodiment, wherein the sealing member of the sealing element is configured so as to be U-shaped.

The illustrations in the figures according to FIG. 1, FIG. 2, FIG. 3, FIG. 4A as well as 4B, FIG. 5A as well as 5B, FIG. 6A as well as 6B, FIG. 7 as well as FIG. 8 herein highlight in particular also the first aspect according to the present invention, on account of which a headgear 1 (synonymously also referred to as a cover), in particular in the form of a hood or a balaclava, preferably for protective clothing, in particular ABC protective clothing (CBRN protective clothing), preferably for the civilian and/or defense sector, is specifically provided, wherein the headgear 1 has a cap body (main portion) 2*a* for covering the head and a field-of-vision opening 2*b* for receiving and peripherally covering a respiratory mask 3; wherein the headgear 1 in the region of the field-of-vision opening 2*b* moreover has:

- a preferably elastic and/or reversibly elongatable sealing element 4 for bearing in a preferably sealing manner on the respiratory mask 3, wherein the sealing element 4 is disposed and/or provided in an encircling manner in the peripheral region of the field-of-vision opening 2*b*, and/or wherein the sealing element 4 in an encircling manner peripherally delimits the headgear 1 in relation to the field-of-vision opening 2*b*, wherein the sealing element 4, in particular the face (sealing face) of the sealing element 4 that in the worn and/or applied state bears on the respiratory mask 3, is configured so as to be at least substantially flat, in particular in the shape of a tape or a strip, and/or wherein the sealing element 4, in particular the face (sealing face) of the sealing element 4 bearing on the respiratory mask 3, in the worn and/or applied state bears, or is configured so as to bear, so as to be at least substantially flat, in particular in the shape of a tape or a strip, on the respiratory mask 3; and
- a peripheral portion 5 which on the exterior (external side) and/or on the side of the sealing element 4 that faces away from the field-of-vision opening 2*b* has a peripheral portion 5 which at least partially covers and/or overlaps the sealing element 4, wherein the peripheral portion 5 is provided with a tie element 6, and/or wherein the peripheral portion 5 is assigned a tie element 6 such that the peripheral portion 5 is configured so as to push and/or be tensioned against the sealing element 4 from the exterior and/or on the external side and/or in the direction of the field-of-vision opening 2*b*, in particular so as to on account thereof push and/or bring to bear the sealing element 4 onto/on the respiratory mask 3 in the worn and/or applied state.

In terms of preferred design embodiments and embodiments according to the invention of the headgear 1 according to the invention, reference may moreover also be made to the corresponding dependent and coordinate claims.

As is visualized in FIG. 4A, FIG. 4B, as well as FIG. 5B and FIG. 6B, for example, it is the case according to the invention in particular that the peripheral portion 5, in particular the region of the peripheral portion 5 that at least partially covers and/or overlaps the sealing element 4, is configured so as to be freely movable and/or freely positionable on the sealing element 4. On account thereof, an optimal interaction of the peripheral portion 5 on the one hand, and the sealing element 4 on the other hand, can be guaranteed in particular in the worn and/or applied state specifically with a view to the free positioning of the peripheral portion 5 on the sealing element 4 leads to the sealing element 4 being additionally pressed or tensioned, respectively, on the respiratory mask 3 in an optimal manner by the peripheral portion 5, in particular specifically without the sealing element 4 undesirably slipping on account of the influence of force of the peripheral portion 5.

In this context, reference may be made for example to FIG. 4A, or FIG. 4B, respectively, on account of which FIG. 4 demonstrates the free end of the peripheral portion 5, so to speak, having the integrated tie element 6 and the free mobility of said peripheral portion 5 in relation to the sealing element 4. FIG. 4B furthermore visualizes the positioning of the peripheral portion 5 having the tie element 6, and the sealing element 4 being additionally pushed in relation to the respiratory mask 3 by the peripheral portion 5, this being able to be caused in particular by activating or tensioning, respectively, the tie element 6.

The free peripheral region of the peripheral portion 5 having the integrated tie element 6 being discussed is in particular a free longitudinal peripheral region, in particular longitudinal edge, of the peripheral portion 5 that faces in particular the field-of-vision opening 2*b*. As mentioned above, it is in particular the case that the tie element 6 is positioned in the region of this (free) longitudinal peripheral region, in particular longitudinal edge, of the peripheral portion 5. To this end, reference may also be made to the explanations hereunder.

FIG. 5B and FIG. 6B furthermore visualize the underlying principle of the present invention of the previously mentioned free mobility, or free positioning, respectively, of the peripheral portion 5 in relation to the sealing element 4. FIG. 5B in a plan view of the peripheral region of the headgear 1 according to the invention thus visualizes an exemplary state as is present in particular when the headgear is not worn or applied, respectively, or in the case of a tie element 6 which is not tensioned or pulled, respectively. In the case of a tie element 6 which is not tensioned or pulled, respectively, it can in particular be the case that the peripheral region 5, proceeding so to speak from the fixing, or fastening, respectively, of the peripheral region 5 as well as of the sealing element 4 on the cap body 2*a*, projects from the sealing element 4 upward so to speak in the direction of the free longitudinal peripheral region (having the tie element 6).

FIG. 6B furthermore highlights a state, or an arrangement, respectively, as is present in particular in the worn and/or applied state of the headgear 1 according to the invention, on account of which the free longitudinal peripheral region of the peripheral portion 5, in particular in the case of a tensioned tie element 6, bears on the sealing element 4 from the outside, so to speak, on account of which the sealing element 4 is additionally pushed, or brought to bear, respectively, on the respiratory mask from the outside, or the external side, respectively, such that sealing of the transition region, or of the interface, respectively, between the headgear 1 on the one hand, and the respiratory mask 3, or the mask body, respectively, in this regard takes place in an optimal manner.

According to the invention it can be provided in particular that the sealing element 4, in particular exclusively on one of the two longitudinal peripheral regions, in particular longitudinal edges, thereof, is connected to the headgear 1 and/or to the peripheral portion 5 (cf. FIG. 2, FIG. 3, FIG. 4A, FIG. 4B, FIG. 8A, for example). The free positioning capability between the peripheral portion 5 and the sealing element 4 is further configured on account thereof, wherein bringing to bear the sealing element on the respiratory mask 3 in a positive manner is moreover also guaranteed.

According to the invention it can in particular also be the case that the sealing element 4, in particular exclusively on a first of the two longitudinal peripheral regions, in particular longitudinal edges, thereof is connected to the headgear 1 and/or to the peripheral portion 5 (cf. FIG. 2, FIG. 3, FIG. 4A, FIG. 4B, FIG. 8A, for example). According to the invention it is thus in particular provided that the sealing element 4 as a result of the preferred fastening, or connection, respectively, of the sealing element 4 according to the invention only on one of longitudinal peripheral regions, in particular longitudinal edges, of said sealing element 4 moreover has a free longitudinal peripheral region, in particular free longitudinal edge, which is opposite said former longitudinal peripheral region. The free mobility, or free positioning capability, respectively, of the peripheral portion 5 in relation to the sealing element 4, or the bearing of the sealing element 4 on the respiratory mask 3 is also correspondingly facilitated, or improved, respectively, on account thereof.

According to the invention it is advantageous for the sealing element 4 only on one of the two longitudinal peripheral regions, in particular longitudinal edges, thereof to be connected to the headgear 1 and/or to the peripheral portion 5. It can be provided in particular that the sealing element 4 only on a first of the two longitudinal peripheral regions, in particular longitudinal edges, thereof is connected to the headgear 1 and/or to the peripheral portion 5. To this end, reference may likewise be made in an exemplary manner to the previously mentioned figures.

In terms of the preferred design embodiments of the invention hereunder, reference may likewise be made also to the illustrations in the figures.

According to the invention, it is in particular provided that the sealing element 4, in particular exclusively on one (other) of the two longitudinal peripheral regions, in particular longitudinal edges, thereof projects and/or protrudes from the headgear 1 and/or from the peripheral portion 5, in particular in the direction of the field-of-vision opening 2*b*, and/or is configured so as to be free (freely movable) and/or unconnected, in particular in such a manner that the remaining unconnected region of the sealing element 4 in the worn and/or applied state is configured so as to be freely positionable in relation to the respiratory mask 3. To this end, reference may be made in an exemplary manner to FIG. 2, FIG. 3, as well as FIG. 4A and FIG. 4B. As has been mentioned above, the free positioning capability of the sealing element 4 in relation to the respiratory mask 3 leads to the sealing element 4 bearing on the respiratory mask 3, or on the mask body, respectively, in an optimal manner, specifically in the peripheral region of said respiratory mask 3 or said mask body, respectively. The sealing of the transition region is overall improved hereby. The one (other) of the two longitudinal peripheral regions of said sealing element 4 is in particular the longitudinal peripheral region of the sealing element 4 that is opposite the longitudinal region connected to the headgear 1 and/or the peripheral region 5.

In particular, the sealing element 4, in particular exclusively on a second of the two longitudinal peripheral regions, in particular longitudinal edges, thereof can project and/or protrude from the headgear 1 and/or from the peripheral portion 5, in particular in the direction of the field-of-vision opening 2*b*, and/or be configured so as to be free (freely movable) and/or unconnected, in particular in such a manner that the remaining unconnected region of the sealing element 4 in the worn and/or applied state is configured so as to be freely positionable in relation to the respiratory mask 3. This embodiment according to the invention in an exemplary visualizing manner is visualized in FIG. 2, FIG. 3, FIG. 4A, and FIG. 4B. Bringing to bear the sealing element 4 on a respiratory mask 3, or a mask body, respectively, in a positive and reliable manner is overall guaranteed on account thereof.

In general, the sealing element 4 can have a first longitudinal peripheral region, in particular a first longitudinal edge, and a second longitudinal peripheral region, in particular a second longitudinal edge. According to the invention it can be provided herein that the sealing element 4, in particular exclusively on the first longitudinal peripheral region, in particular the first longitudinal edge, is connected to the headgear 1 and/or to the peripheral portion 5, or that the sealing element 4, in particular exclusively on the second longitudinal peripheral region, in particular the second longitudinal edge, projects and/or protrudes from the headgear 1 and/or from the peripheral portion 5, in particular in the direction of the field-of-vision opening 2*b*, and/or is configured so as to be free (freely movable) and/or unconnected, in particular in such a manner, that the remaining unconnected region of the sealing element 4 in the worn and/or applied state is configured so as to be freely positionable in relation to the respiratory mask 3. This is likewise illustrated in a visualizing manner in the figures according to FIG. 2, FIG. 3, FIG. 4A, FIG. 4B, as well as FIG. 8A.

As is visualized according to FIG. 2, FIG. 3, FIG. 4A, FIG. 4B, FIG. 8A, FIG. 8B, the peripheral portion 5, in particular exclusively on one of the two longitudinal peripheral regions, in particular longitudinal edges, thereof can moreover be connected to the headgear 1 and/or to the sealing element 4. In particular, the peripheral portion 5, in particular exclusively on a first of the two longitudinal peripheral regions, in particular longitudinal edges, thereof can be connected to the headgear 1 and/or to the sealing element 4. The free positioning capability, or the free mobility, respectively, of the region of the peripheral portion that at least partially covers or overlaps, respectively, the sealing element 4 in relation to the sealing element 4 is likewise guaranteed on account thereof, this being associated with a uniform influence of force or pressure, respectively, of the peripheral portion 5 having the tie element 6 on the sealing element 4 in the worn and/or applied state of the headgear 1 according to the invention.

According to the invention it can also be provided that the peripheral portion 5 only on one of the two longitudinal peripheral regions, in particular longitudinal edges, thereof is connected to the headgear 1 and/or to the sealing element 4. In particular, the peripheral portion 5 only on a first of the two longitudinal peripheral regions, in particular longitudinal edges, thereof is connected to the headgear 1 and/or to the sealing element 4. This is visualized in a visualizing manner in FIG. 3, FIG. 4A, FIG. 4B, as well as FIG. 5B, FIG. 6B, as well as FIGS. 8A and 8B. As has been mentioned above, this results in particular in that the peripheral portion 5 is configured so as to be freely movable in relation to the longitudinal peripheral region that is opposite the longitudinal peripheral region connected to the headgear 1, or to the sealing element 4, respectively, so to speak, this being associated with a free positioning capability of the unconnected longitudinal peripheral region on the sealing element 4 (cf. FIG. 4A and FIG. 4B, for example).

Consequently, in the context of the present invention it can also be provided that the peripheral portion 5, in particular exclusively on one (other) of the two longitudinal peripheral regions, in particular longitudinal edges, thereof projects and/or protrudes from the headgear 1 and/or from the sealing element 4, in particular in an outward manner, and/or is configured so as to be free (freely movable) and/or unconnected, in particular in such a manner that the region of the peripheral portion 5 that at least partially covers and/or overlaps the sealing element 4 is configured so as to be freely movable and/or freely positionable on the sealing element 4 (cf. FIG. 5B, for example (exemplary states or arrangement, respectively, when the headgear 1 is not worn or applied, respectively) as well as FIG. 6B (exemplary arrangement or state, respectively, in the worn and/or applied state of the headgear 1)).

In particular, the peripheral portion 5, in particular exclusively on a second of the two longitudinal peripheral regions, in particular longitudinal edges, thereof can project and/or protrude from the headgear 1 and/or from the sealing element 4, in particular in an outward manner, and be configured so as to be free (freely movable) and/or unconnected, in particular in such a manner that the region of the peripheral portion 5 that at least partially covers and/or overlaps the sealing element 4 is configured so as to be freely movable and/or freely positionable on the sealing element 4. To this end, reference may also be made to the explanations above.

In view of the explanations above it can thus also be in particular the case according to the invention that the peripheral portion 5 has a first longitudinal peripheral region, in particular a first longitudinal edge, and a second longitudinal peripheral region, in particular a second longitudinal edge, as is illustrated in an exemplary manner in FIG. 2, FIG. 3, FIG. 4A, FIG. 4B, as well as FIG. 8A, FIG. 8B, wherein the peripheral portion 5, in particular exclusively on the first longitudinal peripheral region, in particular longitudinal edge, is connected to the headgear 1 and/or to the sealing element 4, and/or wherein the peripheral portion 5, in particular exclusively on the second longitudinal peripheral region, in particular longitudinal edge, projects and/or protrudes from the headgear 1 and/or from the sealing element 4, in particular in an outward manner, and/or is configured so as to be free (freely movable) and/or unconnected, in particular in such a manner that the region of the peripheral portion 5 that at least partially covers and/or overlaps the sealing element 4 is configured so as to be freely movable and/or freely positionable on the sealing element 4. In terms thereof, reference may be made to FIG. 4A, FIG. 4B, as well as FIG. 5B, FIG. 6B, and FIG. 8A, FIG. 8B, for example. This measure according to the invention contributes toward the linking of the sealing element 4 in an optimal manner on account of the additional influence of force or pressure, respectively, of the peripheral portion 5 having the tie element 6 which in the worn and/or applied state is tensioned or pulled, respectively, is improved, in particular also homogenized, such that the sealing in relation to a respiratory mask 3 is also improved.

According to the invention it is moreover in particular also the case that the peripheral portion 5 has a first longitudinal peripheral region, in particular a first longitudinal edge, and a second longitudinal peripheral region, in particular a second longitudinal edge, wherein the peripheral portion 5, in particular exclusively on the first longitudinal peripheral region, in particular longitudinal edge, is connected to the headgear 1 and/or to the sealing element 4, and/or wherein the peripheral portion 5, in particular exclusively on the second longitudinal peripheral region, in particular longitudinal edge, is configured so as to be free (freely movable) and/or unconnected, in particular in such a manner that the region of the peripheral portion 5 that at least partially covers and/or overlaps the sealing element 4 is able to be brought to bear freely on the sealing element from the outside and/or able to be brought to bear by way of a free position on the sealing element from the outside. To this end, reference may also be made to the explanations set forth above. An higher degree of adaptability or universality, respectively, of the headgear 1 according to the invention is overall guaranteed also on account thereof, since individual adapting to a multiplicity of types, or models, respectively, of respiratory masks can be performed based thereon, specifically also with a view to commercially available types or models, respectively, which are established or frequently used, respectively.

In particular, the sealing element 4, in particular exclusively on one of the two longitudinal peripheral regions, in particular longitudinal edges, thereof can be connected to the headgear 1 and/or to the peripheral portion 5, and wherein the peripheral portion 5 only on one of the two longitudinal peripheral regions, in particular longitudinal edges, thereof can be connected to the headgear 1 and/or to the sealing element 4. It can in particular be the case here in that the remaining unconnected region of the sealing element 4 and the remaining unconnected region of the peripheral portion 5 are configured so as to be freely movable on top of one another and/or independently relative to one another. Moreover, it can in particular also be the case herein that the region of the peripheral portion 5 that at least partially covers and/or overlaps the sealing element 4 is configured so as to be freely movable and/or freely positionable and/or able to be brought to bear freely on the sealing element 4, as is visualized in FIG. 2, FIG. 3, as well as FIG. 4A and FIG. 4B. To this end, reference may also be made to FIG. 5B and FIG. 6B, for example. This measure according to the invention overall also leads to outstanding sealing of the transition region, or the interface, respectively, to a respiratory mask, or a mask body, respectively, wherein a multiplicity of different types or models, respectively, of respiratory masks can be efficiently sealed with regard to the above.

Insofar as the in particular peripheral connection of the peripheral portion 5 to the headgear 1 and/or the sealing element 4, and/or the in particular peripheral connection of the sealing element 4 to the headgear 1 and/or the peripheral portion 5 is concerned, at least one connecting installation 12 can be present with regard to the above, or the respective connection can take place by means of at least one connecting installation 12, respectively. To this end, reference may be made in particular to FIG. 8A and FIG. 8B.

According to the invention it can be provided in particular that the peripheral portion 5, the sealing element 4, and/or the headgear 1 (or the cap body 2_a_, respectively) are connected to one another by means of a single, or common, respectively, connecting installation 12. To this end, reference may likewise be made to FIG. 8A and FIG. 8B. The presence of a single connecting installation 12 herein is associated with the advantage that the production process is simplified and the potential breaches for toxic or harmful substances, respectively, are minimized. The connecting installation 12 can be produced or be present for example, respectively, by means of stitching, adhesive bonding, welding, stapling, or the like, preferably by means of stitching. The connecting installation 12 can in particular be a connecting seam.

In general, it can be provided according to the invention that the peripheral portion 5 comprises a textile planar material or is formed therefrom. As will yet be explained hereunder, this herein can be a textile planar material for example which corresponds to the first textile planar material 2_c_ of the headgear 1 as will yet be defined hereunder. In particular, the peripheral region 5 may be an individual or separate, respectively, textile planar material, or be based on the respective single blank, respectively. For example, the peripheral region can be configured by doubling the underlying textile planar material. In this context, the textile planar material configuring the peripheral region 5 can thus be doubled. The free end regions, or edges, respectively, herein, in particular by means of the connecting installation 12, can in particular be connected to the sealing element 4 and/or the headgear 1, in particular the cap body 2_a_ (cf. FIG. 8A and FIG. 8B, for example). In particular, a cavity 5_a_ in the peripheral portion 5 can be provided in this way, in particular wherein the cavity 5_a_ serves for receiving the tie element 6 and with regard thereto is in particular configured as a tunnel or a drawstring, respectively, as will yet be set forth hereunder (cf. FIG. 4A as well as FIG. 4B, for example).

Furthermore, the peripheral portion 5 can be configured so as to be able to be gathered. Moreover, the peripheral portion 5 can be disposed in an encircling manner in the peripheral region of the field-of-vision opening 2_b_ (cf. FIG. 1, FIG. 5A, and FIG. 6A, for example). On account of the peripheral portion 5 being configured so as to be able to be gathered, the length, or the circumference, respectively, of the peripheral region 5 in terms of the worn and/or applied state of the hood 1 according to the invention can be reduced, or bringing to bear the peripheral region 5 on the sealing element 4 can be homogenized or improved, respectively, in conjunction with the tie element 6 being activated (tensioning or pulling, respectively, the tie element 6) this being associated which a uniform influence of force or pressure, respectively, of the peripheral portion 5, or the region positioned on the sealing element 4 of the peripheral portion 5, respectively, on the sealing element 4. The term "able to be gathered" herein is also to be understood in such a manner that the peripheral portion 5 in terms of the worn and/or applied state in terms of the profile of said peripheral portion 5 along the field-of-vision opening 2_b_ is capable of a assuming a reduced circumference, or a reduced length, specifically based on a corresponding gathering action.

In particular, the peripheral portion 5 in the worn and/or applied state can be disposed and/or positioned on the (flat)

side of the sealing element 4 that faces away from peripheral region of the respiratory mask 3, as is visualized in FIG. 1, FIG. 2, FIG. 4B, for example.

According to the invention it can thus also be provided in particular that the peripheral portion 5 is disposed and/or positioned above the sealing element 4 and/or externally (on the external side) in relation to the sealing element 4. As has been set forth above, an influence of external force or pressure, respectively, on the sealing element 4 can take place hereby so to speak by pushing, or bringing to bear, respectively, the sealing element 4 on the respiratory mask 3.

Moreover, the peripheral portion 5, in particular in an encircling manner along the peripheral portion 5, can have and/or configure a cavity 5*a*, preferably for receiving and/or guiding the tie element 6. In this context, the cavity 5*a* is in particular configured as a tunnel (drawstring tunnel), preferably as a duct. To this end, reference may be made to FIG. 1, FIG. 2, FIG. 3, FIG. 4A and FIG. 4B, as well is FIG. 5A and FIG. 6A, for example. According to the invention it is thus in particular the case that the tie element 6 is received in the cavity 5*a* and/or guided in the cavity 5*a*. On account of the concept according to the invention having the tie element 6 being received in a corresponding cavity 5*a*, it is also guaranteed according to the invention that the material, or the wall, respectively, of the peripheral portion 5 is disposed between the tie element 6 and the sealing element 4 such that the tie element 6 is not in direct contact with the sealing element 4 (such that the tie element 6 does not rub on the sealing element 4, or the like). As will yet be explained hereunder, the tie element 6 can be configured in the form of a preferably elastic cord, for example. In particular, the cavity 5*a* in this case can be present as a so-called drawstring tie, or be configured as the latter, respectively.

According to the invention, the tie element 6 can be received and/or disposed so as to be at least substantially uninterrupted in the peripheral portion 5, in particular in the cavity 5*a* of the peripheral portion 5 (cf. FIG. 5A and FIG. 6A, for example). Direct contact between the tie element 6 and the sealing element 4 is avoided in this way so that the tie element 6 when correspondingly activated does not rub on the sealing element 4. Damage as well as creasing in terms of the sealing element 4 is further avoided in this way.

According to the invention it can moreover be provided that the tie element 6 is configured in one part and/or one piece, in particular in one part and/or one piece so as to be opened, preferably having two ends, or else in one part and/or one piece so as to be closed and/or continuous (cf. FIG. 1B as well as FIG. 5A and FIG. 6A, for example). This can in particular also be provided in the case of the headgear 1 according to the invention being equipped with an opening element 10 which opens out into the field-of-vision opening 2*b*. In particular, the tie element 6 by way of the respective ends can moreover be activated or tensioned, respectively, from the outside, so to speak.

Furthermore, according to the invention it can also be the case that the tie element 6, in particular in an encircling manner along the peripheral portion 5, is disposed and/or received within the peripheral portion 5, in particular in the cavity 5*a* of the peripheral portion 5, wherein the tie element 6 is configured so as to be continuous and/or uninterrupted, in particular by connecting the respective ends of the tie element 6.

With regard to the above it can thus also be provided according to the invention that the tie element 6 is configured so as to be annular in one piece, or annular without interruptions, respectively. For example, the respective ends with regard to above can be stitched to one another. According to this alternative embodiment, the tie element 6 can in particular be received completely in the cavity 5*a* of the peripheral portion 5. The additional influence of force or pressure, respectively, on the sealing element 4 in this case takes place in particular based on an inherent tension, or a preloading, respectively, of the tie element, in particular wherein the tie element 6 is configured so as to be elastically or reversibly elongatable. Construction of this type of the headgear 1 according to the invention is to be considered in particular when the headgear 1 does not possess an opening element 10 which opens into the field-of-vision opening 2*b*, or said headgear 1 is configured so as to be overall closed, respectively. According to this embodiment, the respective ends of the tie element are thus also located in the cavity 5*a*, so to speak, wherein the ends are connected to one another as has been mentioned above.

According to the invention, it can however be provided in particular that the tie element 6, in particular in an encircling manner along the peripheral portion 5, is disposed and/or received within the peripheral portion 5, in particular in the cavity 5*a* of the peripheral portion 5, with the stipulation that the respective ends of the tie element 6 are disposed outside and/or not within the peripheral portion 5, and/or in particular with the stipulation that the respective ends of the tie element 6 are guided out of the peripheral portion 5. This embodiment is illustrated in a visualizing manner in FIG. 1, FIG. 5A, FIG. 6A, and FIG. 7. The tie element 6 can be activated or tensioned, respectively, by way of the outlying ends and in this respect be further put under tension, this being associated with corresponding exertion of force or pressure, respectively, on the sealing element 4.

In this context it can also be provided that the peripheral portion 5, in particular the cavity 5*a* of the peripheral portion 5, has at least one opening 7, in particular two preferably mutually adjacent openings 7, in particular for guiding the tie element 6 through, preferably for guiding the tie element 6 out of the cavity 5*a* of the peripheral portion 5 (cf. FIG. 1, FIG. 5A and FIG. 6A, for example). The opening 7 can in particular be peripherally reinforced. Insofar as the headgear 1 according to the invention has an opening element 10, such as a zip fastener (cf. also the embodiments hereunder) which opens into the field-vision opening 2*b*, the respective openings can be positioned like a zip fastener on the opposite peripheral regions of the opening element 10.

In particular, the ends of the tie element 6 outside the peripheral portion 5, in particular outside the cavity 5*a* of the peripheral portion 5, can be equipped and/or provided with at least one securing and/or locking installation 8, in particular in each case with at least one securing and/or locking installation 8. To this end, reference may likewise be made to FIG. 1, FIG. 5A and FIG. 6A. The tie element 6 with the aid of the securing or locking, respectively, installation 8 can be secured so to speak, and based thereon be held under tension upon prior activation or tensioning, respectively, so that the influence of force or pressure, respectively, on the sealing element 4 in the worn or used state, respectively, is correspondingly maintained. The securing or locking, respectively, installation 8 can be configured or be present, respectively, in the form of a clamp or the like, for example. In particular, both ends of the tie element 6 are equipped with a respective securing or locking, respectively, installation 8.

It can furthermore be provided according to the invention that the tie element 6, in particular in a manner encircling along the peripheral portion 5, is received and/or disposed so as to be freely movable, in particular slidable (able to slide) and/or displaceable, in particular in the peripheral portion 5, preferably in the cavity 5*a* of the peripheral portion 5. The freely movable arrangement of the tie element 6 in the peripheral portion 5, or in the cavity 5*a*, respectively, herein refers in particular to the displacement capability of the tie element 6 in the longitudinal extent, or the longitudinal direction, respectively, thereof.

According to one preferred embodiment of the present invention it can also be provided that the peripheral portion 5 has a tie element guiding installation 9, in particular a tie element guide seam. To this end, reference may in particular be made to FIG. 2 to FIG. 6A and FIG. 6B, as well is to FIG. 8A and FIG. 8B. In particular the tie element guiding installation 9 can thus be provided by means of stitching, or be configured as a corresponding seam, respectively.

In general, according to the invention the tie element guiding installation 9 can be disposed and/or positioned in an encircling manner along the peripheral portion 5 (cf. FIG. 1, FIG. 5A, as well as FIG. 6A, for example).

Furthermore, according to the invention the tie element guiding installation 9 can delimit the cavity 5*a* of the peripheral portion 5, in particular in an encircling manner along the peripheral portion 5. This is visualized in particular in FIG. 2, FIG. 3, FIG. 4A, FIG. 4B, as well as in FIG. 5B, FIG. 6B, FIG. 8A and FIG. 8B. The size of the cavity 5*a* can thus be individually predefined by the tie element guiding installation 9. Based thereon, the guiding, or the free mobility, respectively, and the sliding of the tie element 6 in the cavity can be improved. In particular, the size, or the diameter, respectively, of the cavity 5*a* can be set or predefined, respectively, in a targeted manner, by the tie element guiding installation 9, on account of which the positioning of the portion of the peripheral region 5 having the tie element 6 in relation to the sealing element 4 can be further improved in terms of precision, or be further predefined, respectively.

According to the invention, the tie element 6 and/or the cavity 5*a* can be disposed peripherally in the peripheral portion 5, in particular on the side of the peripheral portion 5 that faces away from the cap body 2*a*, and/or on the side of the peripheral portion 5 that faces away from the connection between the peripheral portion 5 and the cap body 2*a* and/or the sealing element 4. It can be provided in particular according to the invention that the tie element 6, or the cavity 5*a*, respectively, are/is disposed in the region of the previously mentioned free longitudinal peripheral region of the peripheral portion 5, or the longitudinal peripheral region of the peripheral portion 5 which is not connected to the sealing element 4 or to the hood 1, respectively. Based thereon, an optimized alignment, or influence of force and/or pressure, respectively in relation to the sealing element 4 can be guaranteed in the worn or used, respectively, state. Moreover, the free positioning capability on the sealing element 4 is yet again improved.

According to the invention it is advantageous for the tie element 6 and/or the cavity 5*a*, in particular in an encircling manner along the peripheral portion 5, to be disposed and/or positioned so as to be at least substantially centric on the sealing element 4.

In particular, the tie element 6 and/or the cavity 5*a*, in particular in an encircling manner along the peripheral portion 5, can be disposed and/or positioned so as to be centric to peripheral on the sealing element 4, in particular on that (peripheral) region of the sealing element 4 that faces away from the cap body 2*a* and/or on that (peripheral) region of the sealing element 4 that faces away from the connection between the sealing element 4 and the cap body 2*a* and/or the sealing element 4. To this end, reference may be made to FIG. 4B and FIG. 6B, for example. On account thereof, the influence of force or pressure, respectively, of the peripheral region 5, or of the tie element 6, respectively, on the sealing element 4 is generally optimized. It is moreover guaranteed on account thereof that the region of the peripheral portion 5 having the tie element 6 remains disposed or positioned, respectively, on the sealing element 6 even in the case of minor deviations in terms of the profile.

According to the invention, the tie element 6 can be configured in the shape of a thread and/or a string and/or a cord, in particular in the shape of a cord. Moreover, the tie element 6 can be configured as a thread and/or as a yarn and/or as a string and/or as a cord, in particular as a cord, preferably as a flat cord or round cord, preferably as a round cord. According to the invention the tie element 6 can have an at least substantially (circular) round cross section. On account thereof, the mobility, or the sliding of the tie element 6, respectively, in the cavity 5*a* of the peripheral portion 5 is also improved.

In particular, the tie element 6 can have a diameter in the range from 1 mm to 10 mm, particularly in the range from 2 mm to 8 mm, preferably in the range from 3 mm to 6 mm, preferably in the range from 3 mm to 5 mm.

In particular, the tie element 6 can be configured so as to be elastic and/or reversibly elongatable. Furthermore, the tie element 6 can comprise at least one elastic and/or reversibly elongatable material, or be composed thereof.

The term "elastic" or "reversibly elongatable", respectively, as is used according to the invention in particular for the tie element 6 as well as hereunder also for the sealing element 4, herein is to be interpreted very widely according to the invention. In particular, the term discussed relates to an elastic behavior, on account of which an increase in the length, or an elongation, respectively, of the underlying material takes place under a corresponding tensile or elongation load, respectively, or under corresponding tensile or elongation stress, respectively (tensile or elongation force, respectively), and on account of which the material upon cancelling the tensile force, or the elongation force, respectively, is capable of at least substantially reassuming its original state, or of at least substantially reassuming its original length, respectively.

In this context, the elastic and/or reversibly elongatable material of the tie element 6 can comprise at least one elastomer, in particular a natural and/or synthetic elastomer, or be composed thereof. In this context, the elastic and/or reversibly elongatable material of the tie element 6 can moreover be a rubber and/or natural rubber material, in particular a silicone rubber and/or a butyl rubber.

Furthermore, the elastic and/or reversibly elongatable material of the tie element 6 can be a synthetic polymer, preferably based on a block copolymer having polyurethane and polyethylene glycol as component parts.

According to the invention, the tie element 6 as a monofilament yarn can be configured from the elastic and/or reversibly elongatable material of tie element 6.

In contrast however, the tie element 6 can also be configured as a multifilament yarn having a multiplicity of individual filaments from the elastic and/or reversibly elongatable material of the tie element 6.

According to the invention, it can also be provided that the tie element 6 has a core from the elastic and/or reversibly elongatable material of the tie element 6 as well as an in particular textile casing and/or coating. On account thereof, the friction of the tie element within the cavity 5*a* is reduced such that the tie element based thereon can better be guided along the cavity 5*a*, or slide along the latter, respectively. In this context, the textile casing and/or coating may be configured based on polyester and/or polyamide.

According to the invention, the sealing element 4 can be configured in one part and/or one piece, in particular in one part and/or one piece so as to be opened, (in one piece and interrupted), preferably having two ends. A design embodiment of this type may be considered, for example, when the headgear 1 according to the invention is equipped with an opening element 10 which opens out into the field-of-vision opening 2*b*.

In contrast, the sealing element 4 can be configured in one part and/or one piece so as to be closed and/or continuous. In this context, the sealing element 4 can in particular be configured so as to be closed in an annular manner. For example, the ends of the sealing element can be connected to one another. A design embodiment of this type is to be considered in particular in the case of the headgear 1 according to the invention not being provided with an opening element 10 which opens out into the field-of-vision opening 2*b*, or in the case of this being a closed headgear.

According to the invention, the sealing element 4 can generally be configured in the form of a tape, in particular a flat tape. In this context, the sealing element 4 can be configured in the form of a flat tape having two opposite flat sides. This is visualized in FIG. 2, FIG. 3, FIG. 4A, and FIG. 4B, for example. The sealing element 4 can in particular be configured as a sealing tape.

With regard to above, the sealing element 4 in this context, in the worn and/or applied state, by way of one of the flat sides thereof can bear in particular peripherally on the respiratory mask 3, and/or by way of one of the flat sides thereof be positioned and/or disposed in relation to the respiratory mask 3, as is visualized in FIG. 2 as well as FIG. 4B, for example. Based thereon, the sealing element 4 can thus bear in a planar manner on the respiratory mask 3, so to speak, or bear by way of a relatively large contact face on the respiratory mask 3, respectively, this overall improving the sealing behavior.

According to the invention it can also be provided herein that the peripheral region having the tie element 6 is positioned on that flat side that in the worn and/or applied state faces away from the respiratory mask 3, such that with regard to above a large contact face in terms of the peripheral portion 5 is provided (this being associated with a high degree of variability in terms of the positioning capability on the sealing element 4).

In this context, the sealing element 4 in the worn and/or applied state by way of one of the flat sides thereof can moreover face the respiratory mask 3 (cf. FIG. 2, FIG. 4B, for example).

In this context, the peripheral portion 5 having the tie element 6 can moreover bear on and/or be positioned and/or disposed on that flat side of the sealing element 4 that in the worn and/or applied state faces away from the respiratory mask 3 (specifically on that flat side of the sealing element 4 that in the worn or applied state faces away from the respiratory mask 3, cf. FIG. 2, FIG. 4B, for example).

According to the invention it is advantageous for the sealing element 4, in particular the flat side(s) of the sealing element 4, to be configured so as to be at least substantially without a bead, and/or so as to at least substantially not have any protrusions and/or so as to at least substantially not have any thickenings, as is visualized in FIG. 3, FIG. 4A, and FIG. 4B, for example. The concept according to the invention is thus associated with a further simplification in terms of construction, on account of which the sealing element 4 is specifically configured so as to be uniform or smooth, respectively, so to speak. It is in particular the case herein that the face, in particular flat side, of the sealing element 4 that in the worn or applied state bears on the respiratory mask 3 is configured so as to be substantially without a bead or flat, respectively, as has been mentioned above. In this context, the uniform, or smooth, respectively, design embodiment of the sealing element 4, or of the face, in particular flat side, that in the worn or applied state bears on the respiratory mask 3 is particularly favorable in terms of the positioning of the sealing element on the mask body.

According to the invention, it is also advantageous for the sealing element 4 to have a width in the range from 1 mm to 70 mm, in particular in the range from 5 mm to 50 mm, preferably in the range from 10 mm to 40 mm, preferably in the range from 15 mm to 35 mm, particular preferably in the range from 20 mm to 30 mm. The width indications above herein refer in particular to the flat side(s) of the sealing element 4.

According to the invention, the sealing element 4 can moreover have a height (thickness) in the range from 0.1 mm to 10 mm, particularly in the range from 0.2 mm to 8 mm, preferably in the range from 0.5 mm to 5 mm, preferably in the range from 0.75 mm to 4 mm, particularly preferably in the range from 1 mm to 3 mm. The height or thickness indications, respectively, above herein refer in particular to the narrow side(s) of the sealing element 4.

According to one particularly preferred embodiment according to the invention, the sealing element 4 is configured so as to be elastic and/or reversibly elongatable. To this end, reference may be made to the above definition of the term "elastic" or "reversibly elongatable", respectively, which applies to the sealing element 4 in analogous manner. On account of the elastic configuration of the sealing element 4, improved bearing of the sealing element on the respiratory mask 4 is in particular guaranteed, particularly since the sealing element 4 already as a result of the inherent tension thereof bears on the respiratory mask 3 with a corresponding pressure. In the context of the present invention herein it is in particular the case that the tie element 6, at least in terms of the longitudinal extent thereof, or at least in the longitudinal direction thereof, respectively, is configured so as to be elastic or reversibly elongatable, respectively.

According to the invention herein it is in particular the case that the sealing element 4, at least in terms of the longitudinal extent thereof, or in terms of the longitudinal direction thereof, respectively, is configured so as to be elastic or reversibly elongatable, respectively.

According to the invention, the sealing element 4 to this end can comprise at least one elastic and/or reversibly elongatable material, or be composed thereof. In this context, the elastic and/or reversibly elongatable material of the sealing element 4 can comprise at least one elastomer, in particular a natural and/or synthetic elastomer, or be composed thereof. In this context, the elastic and/or reversibly elongatable material of the sealing element 4 can furthermore be a rubber and/or natural rubber material, in particular a silicone rubber and/or a butyl rubber. Furthermore, the elastic and/or reversibly elongatable material of the sealing element 4 may be a polyisoprene material. Moreover, the elastic and/or reversibly elongatable material of the sealing element 4 can be a synthetic polymer, preferably based on a block copolymer having polyurethane and polyethylene glycol as component parts.

According to the invention, the sealing element 4 as a multifilament yarn can be configured having a multiplicity of individual filaments from the elastic and/or reversibly elongatable material of the sealing element 4, or comprise such a multifilament yarn, respectively. In this context, the sealing element 4 can additionally contain a textile component.

For example, the sealing element 4 can be present in the form of a sealing tape or a rubber tape, optionally having textile component parts.

According to the invention, it can however also be provided that the sealing element 4 is composed of the elastic and/or reversibly elongatable material of the sealing element 4.

According to the invention it can preferably be provided herein that the sealing element 4 is configured as a solid material, so to speak, based on, or in the form of, respectively, the elastic and/or reversibly elongatable material of the sealing element 4.

In general, the sealing element 4 in terms of the initial length thereof can have an relative elastic elongation capability of at least 25%, particularly at least 35%, preferably at least 55%, preferably at least 75%, particularly preferably at least 90% or more.

The sealing element 4 can moreover have an elasticity modulus, in particular an elongation elasticity modulus, in particular 25° C., of at most 5.108 N/m2, particularly at most 5.107 N/m2, preferably at most 5.106 N/m2, preferably at most 106 N/m2. In particular, the sealing element 4 can have an elasticity modulus, in particular an elongation elasticity modulus, in particular 25° C., in the range from 106 N/m2 to 5.108 Nm2, in particular in the range from 2.5.106 N/m2 to 108 N/m2, preferably in the range from 5.106 N/m2 to 107 N/m2.

The electricity properties of the materials, or components, respectively, used, such as in particular of the sealing element 4 (or else the tie element 6) can generally be determined in particular as a function of the underlying material and the characteristics thereof, for example according to DIN EN ISO 527, in particular DIN EN ISO 527-2: 2012 (for example while using a specimen having a width of 15 mm at a clamping length of 50 mm and a testing speed of 50 mm/min), or according to DIN 53585, in particular DIN 53585-2:1981, for example.

According to the invention it is moreover advantageous for the sealing element 4 to have a coating, in particular for the purpose of the sealing element 4 sealing, adhering and/or not slipping in relation to the respiratory mask 3.

In this context, the coating can be disposed on and/or applied to the side, in particular flat side, of the sealing element 4 that in the worn and/or applied state faces the respiratory mask 3. According to the invention it can be in particular the case herein that the face, in particular flat side, of the sealing element 4 that in the worn or applied state bears on the respiratory mask 3 is provided with the coating discussed. As mentioned above, it is prevented on account thereof that the sealing element slips, or is displaced, respectively, in relation to the respiratory mask 3, specifically also with a view to intense or excessive movements, respectively, of a user in the worn and/or applied state such that a sealing fit is furthermore provided even under adverse conditions, or when in use, respectively.

It is furthermore advantageous according to the invention for the coating to comprise a silicone and/or a silicon rubber, or to be composed thereof. The afore-mentioned materials have particularly positive anti-slip properties and at the same time a high degree of sealing and resistance in relation to toxic or harmful substances, respectively.

According to one embodiment according to the invention, the sealing element 4 can in principle also be configured as a textile material, in particular as a knitwear, preferably a knitted or warp-knitted fabric, preferably a knitted fabric. With regard to the above, the sealing element 4 in the form of a textile material can comprise the elastic and/or reversibly elongatable material of the sealing element 4, for example in the form of monofilaments and/or multifilaments or be composed thereof. Optionally, the sealing element 4 in the form of a textile material can comprise further textile component parts such as textile yarns or filaments. In particular, the sealing element 4 configured in the form of a textile material can also be equipped with the afore-described coating, in particular wherein the coating is disposed on and/or applied to the side, in particular flat side, of the sealing element 4 that in the worn and/or applied state faces the respiratory mask 3.

Embodiments pertaining to a further embodiment according to the invention are provided hereunder, wherein the headgear 1 according to the invention in addition to the peripheral portion having the peripheral region 5, or the sealing element 4, respectively, is equipped with further or additional sealing elements, respectively.

According to a further embodiment of the present invention it can moreover be provided that the headgear 1 moreover and/or furthermore comprises at least one sealing element, preferably exactly two sealing elements. The optionally present sealing elements discussed herein can fundamentally yet again improve the adaptation of the headgear in relation to a respiratory mask 3, specifically with a view to special types or models, respectively, of respiratory masks which possess, for example, particularly heavily molded concave regions, for example in the region of the cheeks or facial bones. The fit, or the positioning, respectively, of the sealing element in relation to the underlying respiratory mask is thus further improved on account of the use of the sealing elements discussed, this yet again potentially increasing the degree of variability, or universality, of the headgear 1 according to the invention.

The sealing element herein can be configured so as to be elastic and/or reversibly elongatable. To this end, reference can also be made to the definition above.

According to the invention, the sealing element can be disposed on the internal side and/or on the side of the headgear 1 that in the worn and/or applied state is assigned to a user (wearer).

The sealing element can furthermore be disposed in the lateral peripheral region of the headgear 1 toward the field-of-vision opening 2*b*. In particular, the sealing element can extend into the lateral peripheral region of the headgear 1 toward the field-vision-opening 2*b*.

According to the invention, the sealing element in the worn and/or applied state can be disposed in the lateral peripheral region of the headgear 1 toward the field-of-vision opening 2*b* so as to be level with the cheeks and/or so as to be level with the ears of a user.

According to the invention, the sealing element can moreover be disposed in the lateral region of the headgear 1 toward the field-of-vision opening 2*b*.

In particular, in the context of the present invention the sealing element in the worn and/or applied state can extend across a lateral peripheral region of the headgear 1 toward the field-of-vision opening 2*b* so as to be level with the cheeks and/or so as to be level with the ears of a user.

In the context of the present invention it can in particular also be the case that the sealing element peripherally adjoins the peripheral portion 5 and/or the sealing element 4, in particular at a spacing in the range from 2 mm to 50 mm, particularly in the range from 5 mm to 30 mm, preferably in the range from 10 to 25 mm, from the peripheral portion 5 and/or from the sealing element 4.

The peripheral region of the headgear mentioned in the context of the positioning of the sealing element herein refers in particular to the peripheral region of the headgear 1, or of the cap body 2*a*, respectively, that is disposed toward the field-of vision opening 2*b*, or that region which borders the field-of-vision opening 2*b*. Consequently, the peripheral region discussed can synonymously also be referred to as a seam (which surrounds the field-of-vision opening 2*b*). According to the invention it is preferable herein for the sealing element, as mentioned above, to be positioned at a (minor) spacing from the peripheral portion 5, or the sealing element 4, respectively, in particular so as to thus enable the adaptation in relation to an underlying type or model, respectively, of a respiratory mask 3 to be further optimized.

Moreover, the sealing element along the field-of-vision opening 2*b* can at least be substantially adapted to the profile of the peripheral portion 5 and/or the profile of the sealing element 4. Consequently, it can be provided in particular according to the invention that the shape, or the profile, respectively, of the sealing element that faces the peripheral portion 5, or the sealing element 4, at least substantially receives the corresponding shaping, or the corresponding profile, respectively, of the peripheral portion 5, or of the sealing element 4, respectively, so to speak.

According to the invention it can moreover also be provided that the sealing element peripherally tapers and/or peripherally decreases in terms of the thickness thereof. According to the invention, the sealing element can in particular be peripherally graded and/or sloped at least in regions.

According to the invention, it is advantageous for the sealing element to be configured in the shape of a cushion and/or of a bolster. According to the invention it is thus advantageous for the sealing element to be configured in the form of a cushion and/or bolster. On account thereof, adapting, or sealing, respectively, in relation to an underlying respiratory mask 3 can be further improved, or individually adapted, specifically in particular also with a view to the respective type of respiratory mask 3 being used.

According to the invention, the sealing element can in particular be configured in the form of an air cushion, a gel cushion, or a foam cushion, in particular in the form of an air cushion or a gel cushion, preferably in the form of a gel cushion. According to the invention, the sealing element can have an external sheathing for receiving air, gel, and/or foam.

It can be provided in particular according to the invention that the sealing element is fixedly or permanently connected, respectively, or else releasably or removably connected, respectively, to the headgear 1. With regard to the releasable or removable, respectively, design embodiment, a higher degree of flexibility with a view to adapting in relation to respective types of respiratory mask 3 in particular can be performed, specifically in terms of the headgear 1 per se.

According to the invention, the sealing element can be incorporated and/or integrated, in particular sewn, into an inner material and/or an inner lining, preferably into the second textile planar material 2*d* (yet to be described hereunder), of the headgear 1, in particular into an inner material and/or an inner lining, preferably a second textile planar material 2*d* (yet to be described hereunder), of the headgear 1, that is disposed so as to be peripheral toward and/or on the field-of-vision opening 2*b*.

According to the invention, the sealing element can also be applied, in particular sewn, to an inner material and/or an inner lining, preferably to the second textile planar material 2*d* (yet to be described hereunder), of the headgear 1, in particular to an inner material and/or an inner lining, preferably a second textile planar material 2*d* (yet to be described hereunder), of the headgear 1, that is disposed so as to be peripheral toward and/or on the field-of-vision opening 2*b*.

In contrast, according to the invention the sealing element can also be received and/or incorporated in an internal pocket of an inner material and/or an inner lining, preferably of the second textile planar material 2*d* (yet to be described hereunder), of the headgear 1.

Special positioning of the sealing element, in particular with a view to the underlying type of a respiratory mask 3, can be performed in the manner mentioned above.

Further explanations, in particular pertaining to the configuration of the headgear 1 according to the invention, or of the cap body 2*a*, respectively, in terms of the material thereof are stated hereunder.

As is indicated for example in FIG. 8A or FIG. 8B, respectively, according to the invention the headgear 1, in particular the cap body 2*a* can be configured in multiple layers and/or multiple tiers. In particular, the headgear 1, in particular the cap body 2*a*, can comprise a plurality of textile planar materials. In the context of the present invention the textile planar materials herein can be disposed so as to be in sequence on top of one another and/or so as to lie on top of one another. In this context, the respective textile planar materials can in each case be specially configured, or have in each case special functions or properties, respectively. On account of the special selection and tuning of the underlying textile materials, the headgear overall can thus be equipped, or made-to-measure, respectively, with further properties.

According to the invention it is thus advantageous for the headgear 1, in particular the cap body 2*a*, to comprise a first textile planar material (first textile material) 2*c*, in particular a cover material (upper material), as depicted in FIG. 8A or FIG. 8B, respectively.

In this context, it is in particular the case according to the invention that the first textile planar material 2*c* in the worn and/or applied state is disposed on the side of the headgear 1, in particular of the cap body 2*a*, that faces away from the user.

According to the invention it is in particular the case that the first textile planar material 2*c*, in particular the cover material, is configured as a knitwear, in particular a knitted or worn-knitted fabric, a woven fabric, a non-woven fabric, or a textile composite material, in particular as a knitwear or a woven fabric, preferably as a woven fabric.

According to the invention it can also be provided that the first textile planar material 2*c*, in particular the cover material, comprises at least one type of yarn, doubled yarn, thread and/or fiber selected from the group of natural materials and synthetic materials, preferably selected from the group of cotton; wool; linen; polyesters; polyolefins; polyvinylchlorides;

polyvinylidene chlorides; acetates, in particular cellulosic acetates; triacetates, in particular cellulosic triacetates; polyacrylics, polyamides; polyvinyl alcohols; polyurethanes, polyvinyl esters; viscose; and mixtures or combinations thereof, preferably cotton.

According to the invention it can be provided that the first textile planar material 2*c*, in particular the cover material, has an oleophobic and/or hydrophobic finish and/or coating. According to the invention it can be moreover provided that the first textile planar material 2*c*, in particular the cover material, has a fire retardant and/or flame retardant finish and/or coating.

Overall the first textile planar material 2*c* which is in particular used as the cover material can be equipped to as to be resistant and having further properties, for example with a view to water repellent properties as well as with a view to properties repellent in relation to toxins or warfare agents, respectively, (such that the latter to a specific degree are already repelled by the cover material).

It can be provided according to the invention that the peripheral portion 5 is configured by the first textile planar material 2*c*. The same textile planar material can thus be fundamentally used for the upper material of the headgear 1 on the one hand, and for the peripheral portion 5 on the other hand. According to the invention it is preferable herein for the peripheral portion 5 to be configured by an individual planar material, or by a dedicated blank of the planar material (cf. FIG. 8A or FIG. 8B, respectively, for example). To this end, reference being made to the explanations above.

According to the invention it can also be provided that the headgear 1, in particular the cap body 2*a*, comprises a second textile planar material (second textile material) 2*d*, in particular filter material (inner material, inner lining). Reference in terms thereof may also be made to FIG. 8A as well as FIG. 8B, for example.

According to the invention, the second textile planar material 2*d* in the worn and/or applied state can be disposed on the side of the headgear 1, in particular of the cap body 2*a*, that faces the user. Also with regard thereto, the second textile planar material 2*d* can be specially configured or equipped, respectively, with a view to providing special properties such as adsorptive properties or the like.

In this regard, the second textile planar material 2*d* can in particular be configured in multiple layers and/or multiple tiers. With regard thereto, the second textile planar material 2*d* consequently can comprise the materials described hereunder, or be composed thereof:

In the context of the present invention it can be provided in particular that the second textile planar material 2*d* comprises a base textile material in the form of a knitwear, in particular a knitted fabric or a warp-knitted fabric, a woven fabric, a non-woven fabric, or a textile composite material, in particular a knitwear.

In this context, the base textile material according to the invention can comprise in particular at least one type of yarn, doubled yarn, thread and/or fiber selected from the group of natural materials and synthetic materials, preferably selected from the group of cotton; wool; linen; polyesters; polyolefins; polyvinylchlorides; polyvinylidene chlorides; acetates, in particular cellulosic acetates; triacetates, in particular cellulosic triacetates; polyacrylics, polyamides; polyvinyl alcohols; polyurethanes, polyvinyl esters; viscose; and mixtures or combinations thereof, preferably cotton.

In this context, the base textile material can in particular also comprise a material, in particular in the form of yarns and/or doubled yarns and/or threads, having an elastic and/or reversibly elongatable properties. On account thereof, a particularly positive adaptability of the headgear 1, or of the cap body 2*a* in relation to a user can be provided, wherein also the fit of the headgear 1 in terms of the transition region to a respiratory mask 3 by way of the respective positioning of the peripheral region 5, or of the sealing element 4, respectively, in relation to a respiratory mask 3 can be yet again improved.

According to the invention, the second textile planar material 2*d* can moreover comprise a carrier textile material in the form of a knitwear, in particular a knitted fabric or worn-knitted fabric, a woven fabric, a non-woven fabric, or a textile composite material, in particular a knitwear. A knitwear per se herein is in particular distinguished by a high degree of elongatability, this yet again improving the adapting of the headgear 1, or of the cap body 2*a*, in relation to a user.

With regard to the above, the carrier textile material can comprise at least one type of yarn, doubled yarn, thread and/or fiber selected from the group of natural materials and synthetic materials, preferably selected from the group of cotton; wool; linen; polyesters; polyolefins; polyvinylchlorides; polyvinylidene chlorides; acetates, in particular cellulosic acetates; triacetates, in particular cellulosic triacetates; polyacrylics, polyamides; polyvinyl alcohols; polyurethanes, polyvinyl esters; viscose; and mixtures or combinations thereof, preferably polyamide.

According to the invention it is advantageous for the second textile planar material 2*d* to comprise an adsorbent which adsorbs chemical toxins and/or warfare agents, in particular a material based on activated carbon, preferably in the form of activated carbon particles in granular form ("granular carbon") or spherical form ("spherical carbon"), and/or is equipped therewith. On account thereof, the headgear 1 can overall be equipped with properties adsorptive in relation to toxins or warfare agents, respectively, such that an outstanding protective property is also guaranteed from this point of view.

According to the invention herein it can be provided in particular that the adsorbent is fixed to the carrier textile material and/or to the base textile material by means of an adhesive which is in particular applied in a discontinuous, preferably punctiform, manner.

According to the invention it is advantageous for the mean diameter of the adsorbent particles, in particular of the activated carbon particles, to be 0.01 mm to 2 mm, preferably 0.05 mm to 1 mm, preferably 0.1 to 0.5 mm.

According to the invention it is also advantageous for the adsorbent particles, in particular the activated carbon particles, to be used in a quantity in the range from 40 to 250 g/m2, in particular 50 to 180 g/m2, preferably 55 to 130 g/m2.

According to the invention, the activated carbon may be obtainable by carbonizing and subsequent activation of a synthetic and/or man-made initial material, in particular based on organic polymers. According to the invention, the activated carbon may be obtained from an initial material based on organic polymers, in particular based on sulfonated organic polymers, preferably based on divinylbenzene cross-linked polystyrene, preferably based on styrene/divinylbenzene copolymers, in particular by carbonization and subsequent activation of the initial material.

In this context, the content of divinylbenzene in the initial material can be in the range from 1% by weight to 20% by weight, particularly 1% by weight to 15% by weight, preferably 1.5% by weight to 12.5% by weight, preferably 2% by weight to 10% by weight, in terms of the initial material.

Moreover, the initial material in this context can be an in particular sulfonated ion-exchange resin, and/or an ion-exchange resin containing sulfonic acid groups, in particular of the gel type.

With regard to above, the activated carbon used can in particular be a polymer-based spherical activated carbon (PBSAC), and/or wherein the activated carbon is a polymer-based spherical activated carbon (PBSAC).

With regard to the above, the second textile planar material 2*d* can in particular be constructed in such a manner that the adsorption material is disposed between the base textile material on the one hand and the carrier textile material on the other hand.

Insofar as the particle sizes of the adsorbent particles are concerned, said particle size can thus be determined in particular based on the method according to ASTM D2862-97/04. Moreover, the afore-mentioned particle sizes can be determined with methods of determination based on a screen analysis, x-ray diffraction, laser diffractometry, or the like. The respective methods of determination per se are well known to the person skilled in the art such that no further explanations in terms thereof are required.

The activated carbon used herein may be fundamentally obtained according to known methods in the prior art. For this purpose, in particular spherical sulfonated organic polymers, in particular based on divinylbenzene cross-linked polystyrene, are carbonized and subsequently activated so as to form the respective activated carbon, in particular as has been set forth above. For further details in this regard, reference may be made, for example, to publications DE 43 28 219 A1, DE 43 04 026 A1, DE 196 00 237 A1, as well as EP 1 918 022 A1 or is referred to the parallel U.S. Pat. No. 7,737,038 B2 belonging to the same patent family, the respective content thereof being fully incorporated herein by reference.

Activated carbon is used in the context of the present invention are generally commercially available. In particular, activated carbons which are marketed, for example, by Blücher GmbH, Erkrath, Germany, can be used.

According to a further embodiment according to the invention, the headgear 1, in particular the cap body 2*a*, can have an in particular elastic and/or reversibly elongatable further inner material which is disposed so as to be peripheral toward and/or on the field-of-vision opening 2*b* and/or peripherally adjoins the peripheral portion 5 and/or the sealing element 4. The inner material in the worn or applied, respectively, state herein is in particular disposed on the (internal) side of the headgear 1 that faces the user, in particular in a common plane with the second textile planar material 2*d*. Moreover, the further inner material can however also be applied to the second textile planar material 2*d*, for example by sewing or the like.

In general, the further inner material should be configured so as to be elastic or reversibly elongatable, respectively. In general, a textile material can be used to this end. A textile material based on the second textile planar material 2*d*, and/or in the form of the latter, as described above, can preferably be used.

In this context, it can be provided according to the invention that the inner material is configured so as to be at least substantially annular and/or extends at least substantially completely along the field-of-vision opening 2*b*.

In this context, it can moreover also be provided according to the invention that the inner material is undersized, in particular in terms of the length and/or the circumference of the field-of-vision opening 2*b* and/or in particular in terms of the length and/or the circumference of the peripheral portion 5 and/or of the sealing element 4. The adaptation, or the fit, of the headgear in the worn or applied, respectively, state is further improved on account of the inner material being configured so as to be undersized, specifically in particular that the portion of the headgear by way of the inner part bears more tightly on the user, this in turn leading to an improved fit, or to an improved adaptation, respectively, of the sealing element 4, or of the peripheral region 5 with a view to the sealing action of a respiratory mask 3.

According to the invention it is also advantageous for the headgear 1, in particular the cap body 2*a*, to bes configured so as to be permeable to gas, in particular permeable to air, and/or permeable to water vapour.

In this context, the headgear 1, in particular the cap body 2*a*, can have a gas permeability, preferably an air permeability, in particular determined according to DIN EN ISO 9237 (i.e. DIN EN ISO 9237:1995-12) and/or in particular determined at 100 Pa, of at least 500 l/m2.min, preferably at least 1000 l/m2.min, preferably at least 2000 l/m2.min, particularly preferably at least 3000l/m2.min.

According to the invention it can moreover also be provided that the headgear 1, in particular the cap body 2*a*, is configured so as to be permeable to water vapour.

In particular, the headgear 1, in particular the cap body 2*a*, at stationary conditions at 20° C., can have a resistance to water vapor transmission Ret of at most 18 (m2.Pascal)/Watt, in particular at most 14 (m2.Pascal)/Watt, preferably at most 9 (m2.Pascal)/Watt, particularly preferably at most 4 (m2.Pascal)/Watt.

The resistance to water vapour transmission Ret can in particular be measured according to DIN EN 31 092:1993, or according to the identical international standard ISO 11092 of February 1994 ("Textiles—physiological effects, measurement of the resistance to thermal transmission and water vapour transmission at stationary conditions (sweating guarded-hotplate test)).

A particularly high degree of wear comfort is guaranteed on account thereof, since the body sweat can be effectively wicked.

According to the invention, the headgear 1, in particular the cap body 2*a*, can moreover be configured so as to be openable, in particular by means of an opening element 10. Donning and taking off the headgear 1 can be facilitated on account thereof.

According to the invention it can in particular be provided so that the headgear 1, in particular the cap body 2*a*, has an opening element 10, in particular for opening the headgear 1, in particular of the cap body 2*a*.

According to the invention, the opening element 10 can open out into the field-of-vision opening 2*b*, in particular into a lateral and/or lower portion and/or region of the field-of-vision opening 2*b*.

According to the invention, the opening element 10, moreover in particular at the front, can open out into the lower opening, in particular the opening of the headgear 1, in particular of the cap body 2*a*, that in the worn and/or applied state receives the upper body of a user.

According to the invention, the opening element 10 from the field-of-vision opening 2*b*, in particular from a lateral and/or lower portion and/or region of the field-of-vision opening 2*b*, can in particular extend to the lower opening, in particular to the opening of the headgear 1, in particular of the cap body 2*a*, that in the worn and/or applied state receives the upper body of a user. On account thereof, the headgear 1 is configured so as to be openable across the entire area thereof, so to speak.

The opening element 10 may be formed by an opening element of an underlying item of protective clothing. For example, a front zip fastener of a protective jacket may continue up to the field-of-vision opening 2*b*.

According to the invention, the opening element 10 can be a hook-and-loop fastener and/or a zip fastener, in particular a zip fastener.

According to the invention, the opening element 10, at least in portions and/or regions, preferably completely, can be provided with and/or covered by an overflap and/or an underflap. The overflap and/or the underflap herein can comprise the textile material forming the headgear 1, in particular based on the first textile planar material 2*c* and/or the second textile planar material 2*d*, or be composed thereof.

In this context, the underflap and/or the overflap can be able to be closed and/or able to be brought to bear on the headgear 1, in particular on the cap body 2*a*, by means of a hook-and-loop fastener or the like.

According to the invention, it can also therefore be the case that the sealing element 4 in the region of the orifice of the opening element 10 toward the field-of-vision opening 2*b* and/or in the region of the interruption by the opening element 10 is configured and/or disposed so as to overlap itself. According to the invention, the respective ends of the sealing element 4 in the region of the orifice of the opening element 10 toward the field-of-vision opening 2*b* can in particular be configured and/or disposed so as to be mutually overlapping. Positive sealing is furthermore guaranteed on account thereof.

According to the invention, the headgear 1, in particular the cap body 2*a*, can be configured so as to be closed and/or non-openable.

In this context, the peripheral portion 5 and/or the sealing element 4 can be configured so as to completely encircle the field-of vision opening 2*b* and/or so as to be uninterrupted and/or closed and/or continuous.

According to the invention, the headgear 1 can be a component part of an item of protective clothing 11, in particular of an item of ABC protective clothing (CBRN protective clothing), preferably for the civilian and/or defence sector, as is visualized in FIG. 7.

According to the invention, the headgear 1 in this context can be fixedly (permanently) and/or non-releasably connected to the item of protective clothing 11.

In this context, the headgear 1 however can also be removably and/or releasably connected to the item of protective clothing 11, in particular by means of a zip fastener and/or a hook-and-loop connection.

According to the present invention, the sealing element 4 can comprise a sealing element body 4*a*, or be formed thereby, or be a component part of a sealing element body 4*a*, as is illustrated in a visualizing manner in FIG. 8A and FIG. 8B.

In this context according to the invention, it can be the case in the context of a first embodiment according to the invention that the sealing element body 4*a* is formed exclusively by the sealing element 4. To this end, reference may be made to FIG. 8A, for example.

According to a second embodiment according to the invention, it can however also be the case that the sealing element body 4*a* beside the sealing element 4 has at least one further portion. To this end, reference may be made to FIG. 8B, for example.

Insofar as this second embodiment is furthermore concerned, it can in particular be the case according to the invention that the sealing element body 4*a* comprising the sealing element 4 and the further portion is configured so as to be at least substantially L-shaped or U-shaped. According to this second embodiment according to the invention, the sealing element body 4*a* comprising the sealing element 4 and the further portion can enclose or border a peripheral region of the textile planar material(s) 2*c*, 2*d* of the headgear 1, in particular of the cap body 2*a*, and/or of the peripheral portion 5, as is likewise visualized in FIG. 8B. On account thereof, an additional sealing effect is guaranteed in particular also in the peripheral transition region to the headgear 1, for example with regard to preventing the ingress of toxic and harmful substances between the first textile planar material 2*c* and the second textile planar material 2*c*.

According to the invention, it can also be provided that the face (sealing face) of the sealing element 4 that in the worn and/or applied state bears on the respiratory mask 3 is at least 50%, particularly at least 60%, preferably at least 70%, preferably at least 80%, particularly preferably at least 90%, most particularly preferably at least 95%, even more preferably at least 99%, in terms of the entire face of the sealing element 4 that in the worn and/or applied state faces the respiratory mask 3.

It can moreover also be provided that the face (sealing face) of the sealing element 4 that in the worn and/or applied state bears on the respiratory mask 3 is 50% to 100%, particularly 55% to 99%, preferably 60% to 98%, preferably 70% to 97%, particularly preferably 80% to 96%, in terms of the entire face of the sealing element 4 that in the worn and/or applied state faces the respiratory mask 3.

As stated above and as depicted in FIG. 8A or FIG. 8B, respectively, the connection between the peripheral portion 5, the sealing element 4, or the headgear 1, respectively, can have been implemented by means of at least one connecting installation 12, in particular a connecting seam.

According to the invention it can thus be provided herein in particular that the peripheral portion 5 is connected to the headgear 1 and/or the sealing element 4 by means of at least one connecting installation 12, preferably a single connecting installation 12.

According to the invention it can herein also be provided in particular that the sealing element 4 is connected to the headgear 1 and/or the peripheral portion 5 by means of at least one connecting installation 12, preferably a single connecting installation 12.

Further design embodiments, variants, variations, modifications, particularities, and advantages of the present invention are readily obvious to the person skilled in the art when reading the description, and can be implemented without said person skilled in the art departing from the scope of the present invention.

The present invention hereunder will be furthermore described and visualized, specifically also by means of exemplary embodiments set forth hereunder which are however not at all intended to limit the present invention. Reference hereunder is moreover additionally made to the embodiments and aspects previously described as well as to further design embodiments of the present invention.

As has already been set forth, it is an objective of ABC protective clothing to offer a wearer or user, respectively, optimal protection in relation to hazardous materials such that the user can carry out his/her activities without impediment, on the one hand, and is protected to the best possible extent on the other hand. Potential risk scenarios can be created by accidents, terrorist acts, or armed military conflicts which are in a constant state of change.

The frequency of hazardous situations in which gaseous or liquid chemical harmful substances come in contact with the unprotected skin of people located in hazardous regions and thus can cause undesirable irreversible injuries or even death to said people is increasing across the globe. Therefore, the wearing of a corresponding protective equipment, in particular in the form of protective clothing as well as a respiratory mask is indicated or required, respectively, in such hazardous situations. In this context, the protection in relation to military warfare agents and industrial hazards in which toxic industrial chemicals (TICs) are released is furthermore of increasing importance; such protection can likewise also be guaranteed in the context of the present invention.

A critical factor which contributes to the protective performance of the protective system are the interfaces which represent the contact regions between the protective clothing, and in particular the corresponding seam, and the additional protective installations which cover the remaining regions of the body such as feet, hands, and the head/face. In terms of the entire protective suit, the interfaces are concentrated in particular in the region of the ends of the pants and the foot protection, of the jacket and of the pants, of the sleeve and the hand protection, and of the head and the respiratory protection. In the context of the present invention, the focus herein is in particular on the particularly critical location, or the transition region, respectively, between a headgear or a head protection, respectively, and a respiratory mask. The headgear, or the head protection, respectively, as is presently provided herein can be present, for example, as an integrated cap of a jacket or of a protective suit, as well as, for example, as a separate cap in the manner of a storm cap.

Adapting the headgear to the mask body, or the mask body shell, respectively, is a further particular challenge by virtue of the multiplicity of available respiratory upper lattice models with the numerous different shapes thereof, such as concave and convex zones, for example, as well as dissimilar circumferences, wherein said adapting is also possible in the context of the present invention.

A particular focus of the present invention is thus also to be seen in developing and providing an improved (headgear) cap/protective breathing apparatus interface design, in particular for ABC or CBRN protective clothing, respectively.

According to the invention, protective clothing which matches the concept of wear of numerous application requirements or user requirements, respectively, is also provided herein. Important aspects such as resistance to ergonomic and thermal stress and a high protective performance are tuned to one another according to the invention, also against the background of the respective special necessities or requirements, respectively, in terms of application or use, respectively.

According to the invention, an ABC or CBRN protective cap which has ergonomic properties and which can be applied to all commercially relevant types of respiratory mask on the one hand, and provides an enhanced protective performance on the other hand, is also provided herein.

The present invention thus enables an interface solution between the headgear and the protective breathing apparatus, or the respiratory mask, respectively, which prevents the ingress, or the passage, respectively, of gaseous or liquid harmful substances to be provided.

Critical or disadvantageous, respectively, aspects of existing cap designs of the prior art will be discussed in terms of head protection on the one hand, as well as the new variants according to the invention having the advantages associated therewith, on the other hand.

The evaluation and the judgement of the headgear according to the invention together with the respective new design will be described thereafter. The approach to evaluation lies in particular in allowing a suitable, qualified and experienced person (SQEP) to carry out the movement protocol as defined in the 2012 version of NATO standard AEP-38. The second step lies in the evaluation according to the nape/head system test in a test chamber using volunteers. The results of these tests will be described and discussed hereunder.

The solution according to the invention on account of which the challenges or issues, respectively, when combining a respiratory mask and a headgear have been surprisingly solved is also highlighted by the explanations pertaining to the construction or the design, respectively, of protective breathing apparatuses or respiratory masks, respectively, on the one hand, and of the headgear provided according to the invention on the other hand. In terms of the protective breathing apparatus or the respiratory mask, respectively, the construction or the design, respectively, of the mask is important since said construction or design, respectively, is decisive for achieving a reliable and tight boundary surface. The following aspects are in particular also relevant herein: the shape of the respiratory mask on which the headgear is to be placed; the regions of the clips which hold, for example, an optionally provided hair net; the chin region; and the mask size. In terms of the aforementioned aspects, an efficient solution having efficient and reliable sealing of the transition region between the headgear and the respiratory mask is provided in the context of the present invention, this being associated with a high degree of adaptability to the underlying type of mask such that a multiplicity of different types of respiratory masks can be included in terms of a high degree of sealing of the interface by way of the solution according to the invention.

Commercially relevant respiratory masks which have in each case dissimilar sizes and shapes will be described in an exemplary manner hereunder, also in terms of the abovementioned relevant aspects. These are the Avon C50 and FM53 respiratory masks, the Dräger M2000 respiratory mask, the Scott GSR respiratory mask, and the American M40 respiratory mask. The size and the shape of the various models has been taken into account to a certain extent in the construction of caps of the prior art, but difficulties on account of leakages did occasionally occur in the prior art.

The respective types of masks herein have, for example, specific circumferences of the mask bodies as well as corresponding lengths of respectively used (fixing) rubber straps.

The Avon C50 and FM53 respiratory masks in the size M have a relatively large circumference. Moreover, the size of the protective breathing apparatuses are adapted to the curvature of the face and are thus very pronounced in terms of the shape thereof. A rubber strap can be more easily attached to the bib-type chin part of the C50 model than to the FM53 model, the latter having a very short chin part which can additionally be deformed, this under pressure leading to creasing.

For example, the lateral clips, the relatively short chin portion in the FM53 model, as well as the curved sides of the C50 model can be listed as critical locations which can potentially impede bringing to bear headgear in a sealing manner.

In contrast, the Dräger M2000 mask has a relatively small circumference in all sizes. This mask has a rather narrow shape but curvatures which are less pronounced than in the Avon masks (C50 and FM53). A relevant region of the M2000 mask is the chin region of the latter, which is designed so as to be relatively short, this at times leading to a higher probability of a seal of a head cover bearing thereon slipping when the user moves.

The circumference of the Scott GSR mask is relatively large in all sizes. This model has a projecting butyl lip which runs across the entire lower part of the mask. A lip of this time can indeed minimize the risk of a seal of a head cover bearing thereon slipping in when a user moves, but it can occasionally arise that a seal bearing thereon is lifted such that leakages can potentially arise.

The headgear according to the invention displays outstanding properties in terms of sealing, adapting, and bearing (prevention of slippage) also in the case of the aforementioned respiratory masks.

The issues of head covers of the prior art are also overcome by the headgear according to the invention, said issues being associated with dissimilar sizes of the protective clothing, specifically in particular concerning cut-outs or openings, respectively, of caps or storm caps, respectively, closures of the cap opening or of the cap periphery, respectively, or of a respective field-of-vision opening. In particular, the headgear according to the invention can be used in a standard size or configuration, respectively, for a multiplicity of items of protective clothing.

In the prior art, for example, the closure, or the opening possibility, respectively, of corresponding headgear is also problematic in particular from the collarbone to the cap cut out, or to the field-of-vision opening, respectively. A further problematic issue in the prior art is the embodiment of the cap periphery toward the field-of-vision opening therein, on account of which at times rather simple constructions using for example rubber straps as said cap periphery exist. However, said rubber straps at times do not provide compensation for the concave regions, for example, of the afore-mentioned Avon masks since the rubber strap lying around the mask is potentially not able to fill or seal, respectively, the curves of the mask such that leakages are created and harmful substances can ingress. This issue has also been overcome according to the invention.

In addition to the special combination or configuration, respectively, of the seam or the peripheral region, respectively, toward the field-of vision opening, specifically based on the sealing element on the one hand and the special peripheral portion having the tie element on the other hand, in order to further counteract the set of issues concerning the concave design the sealing element can further additionally be pushed onto the mask body by sealing elements, in particular in the form of cushions or bolsters, respectively, such as gel or air cushions, or the like, such that the lateral shaped regions of respiratory mask, in particular of the afore-mentioned type, can be yet further sealed, for example. The cushions which have a defined size and shape, can be sewn into an annular, elongatable filter material (for example in the form of the further inner material) in the headgear, for example. The potentially provided cushions in the worn and/or use state can in particular be located so as to be level with the ears, or the cheeks, respectively, of the user, in particular so as to be at least substantially directly at the border to the sealing element, or the elastic strap, respectively.

The previously mentioned flexible filter material, or the textile materials configuring the headgear, respectively, and specifically also in so far as the optionally provided further, and in particular annular, undersized inner material, moreover enable high elasticity and thus further support of the sealing element, or of the elastic strap, respectively.

On account of the concept of the invention, having the combination and the interaction of the sealing element and the peripheral portion having the tie element, any undesirable lifting of optionally existing cushions, for example in the region of the clips of a respiratory mask, which run in particular in each case along the ears of the user, is in particular also counteracted.

Disadvantages of the prior art which are associated, for example, with the use of very wide rubber rings (butyl rings) with a tight annular shape, or a tight internal opening, respectively, such as used as sealing members, have also been overcome by the present invention. A concept of this type of the prior art is indeed associated with a certain degree of sealing which is however not always optimal, but by virtue of the closed and tight annular shape it is at times very difficult for a user to pull a storm cap equipped with such a rubber ring over the head when the protective breathing apparatus is worn. One of the last items of equipment which the user removes during decontamination is the protective breathing apparatus. Therefore, it is only possible to cut open such a (storm) cap and the closure. Otherwise, the respiratory mask can move out of its position during the attempt of removing the cap. This disadvantage is also absent according to the invention.

In general, in terms of the present invention it can also be the case that variable sizes of an underlying protective clothing, such as of a protective suit or a protective jacket, do not influence the cap size and/or the cap blank such that a universal blank is provided according to the invention for a multiplicity of items of protective clothing, as also has been set forth above.

A standard upper material and a standard filter material has been used for the headgear according to the invention, or the respective designs, respectively, since this facilitates the compatibility of the designs and the models are not influenced by virtue of different materials. The approach was made in particular by means of special processing. To this end, an external casing material and a filter material were selected. Established combinations and materials were used in the region of the surface materials. These materials are tested and established and are used in standard single-piece and two-piece suits.

In terms of the solutions it is advantageous for material combinations to be selected, which in terms of processing can be used for all of the designs and at the same time are equipped with a chemical protective property. The comparability is moreover to be ensured, this being the reason for the same material combination having being used for the afore-mentioned models of respiratory masks.

The upper material herein was flame-resistant and oil repellent as well as water repellent.

The woven cotton fabric was woven in a twill weave. The diagonal twill spine in the Z direction is characteristic. In this weave, the intersection points are laterally offset and disposed so as to be mutually adjacent. This twill weave is very tightly woven and displays a positive mechanical strength and durability. The woven fabric has a soft touch. This herein is in particular a standard upper material which is used in the field of ABC or CBRN protective clothing, respectively, and for facilitating the adsorptive performance of the filter material takes into account the air permeability.

Comprehensive protective systems such as jackets, pants, and full-body protective suits can generally not be designed only based on a filter material per se. The designed solutions are composed of the above-mentioned upper material as well as the woven base filter material.

In terms of the headgear according to the invention, the evaluation determining whether the product according to the invention corresponds to the respective requirements, and specifically also whether said product according to the invention is safe and comfortable with a view to allowing a freedom of movement, for example, and whether said product according to the invention enables the task to be carried out by the user without impediment is also very important. The evaluation of the presented designed solution took place in two stages. First, exercises according to the movement protocol AEP-38 were carried out so as to verify the positive and reliable fit of the cap/mask interface. Moreover, a test of the overall system was carried out in a test chamber environment using a stimulant.

The experiments refer in particular to exercises using the afore-mentioned respiratory masks and headgear according to the invention.

The cap peripheries having the rubber strap and the drawstring remained unchanged on the masks during the entire procedure through all exercises performed with the corresponding respiratory masks and cap designs.

The tests or experiments, respectively, were carried out according to the procedures and preconditions as are also set forth hereunder. A plurality of caps according to the invention were tested on different types of respiratory masks for the test runs. The selection of the design tested was made depending on the size of the two volunteers. Once the test subject was prepared for the test run in the form of fixing specially prepared specimen sensors (PADs) on the head and the upper body as well as swallowing a special sensor which monitors the state of health, the test person was equipped as listed in table 1 hereunder.

TABLE 1

| Run | Volunteer | Products I | Products II |
|---|---|---|---|
| 1 | A | CBRN protective jacket having an integrated cover according to the invention<br>CBRN protective pants | Respiratory mask US M40<br>Hand protection: gloves with butyl<br>Foot protection: overshoes with butyl |
| | B | CBRN protective jacket having an integrated cover according to the invention<br>CBRN protective pants | Respiratory mask FM50<br>Hand protection: gloves with butyl<br>Foot protection: overshoes with butyl |
| 2 | A | CBRN protective jacket having an integrated cover according to the invention and zip fastener to the edge of the cover CBRN protective pants | Respiratory mask FM53<br>Hand protection: gloves with butyl<br>Foot protection: overshoes with butyl |
| | B | CBRN protective jacket having an integrated cover according to the invention and zip fastener to the edge of the cover<br>CBRN protective pants | Respiratory mask US M40<br>Hand protection: gloves with butyl<br>Foot protection: overshoes with butyl |
| 3 | A | CBRN balaclava according to the invention<br>CBRN protective pants | Respiratory mask FM53<br>Hand protection: gloves with butyl<br>Foot protection: overshoes with butyl |
| | B | CBRN balaclava according to the invention<br>CBRN protective pants | Respiratory mask C50<br>Hand protection: gloves with butyl<br>Foot protection: overshoes with butyl |

The results shows the protection factor and the protective property of the evaluated cover models with the corresponding protective breathing apparatus and the arrangement of the specimen sensors (PADs). Table 2 shows the test results of run 1.

TABLE 2

| PAD location | Protection factor Cover according to the invention with M40 | Protection factor Cover according to the invention with FM50 |
|---|---|---|
| Scalp | 461 | 38 |
| Forehead | 600 | 527 |
| Right ear, top rear | 83 | 12 |
| Cheek, right side | — | 122 |
| Neck, right side | 7 | 29 |
| Nape | 77 | 19 |
| Occiput | 415 | 543 |
| Back, rear | 22 | 13 |
| Neck, left side | 412 | 7 |
| Left ear, top rear | 600 | 43 |
| Cheek, left side | — | 600 |
| Behind the left ear | 600 | 43 |

When the protection factor has a value of 1, this means that the entire specimen sensor (PAD) has been penetrated by the stimulant (methyl salicylate, MeS) (so that the stimulant was able to pass the suit at an open location). When the protection factor has a value of more than 100, this means that the specimen sensor, or the pad, respectively, has indeed been exposed to MeS but to such a minor extent that the user would not be in mortal danger.

Summarizing, it can be established that the concept according to the invention can be used for the type of mask and, based thereon, that significantly improved protective properties are present, or result, respectively.

Table 3 shows the test results of runs 2 and 3 with the covers according to the invention with the zip fastener and the storm caps according to the invention. The first two columns from the left show that all of the specimen sensors (PADs) are functioning and that the protective properties overall are comparable.

TABLE 3

| PAD Location | Protection factor Cover according to the invention with zip fastener and with FM53 | Protection factor Cover according to the invention with zip fastener and with M40 | Protection factor Balaclava according to the invention with FM53 | Protection factor Balaclava according to the invention with C50 |
|---|---|---|---|---|
| Scalp | 61 | 318 | 35 | 1818 |
| Forehead | 218 | 1430 | 244 | 353 |
| Right ear, top rear | 416 | 250 | 133 | 195 |
| Cheek, right side | 1833 | 180 | 1840 | 822 |
| Neck, right side | 39 | 152 | 39 | 35 |
| Nape | 239 | 240 | 302 | 3000 |
| Occiput | 377 | 280 | 845 | 191 |
| Back, rear | 383 | 202 | 3000 | 185 |
| Neck, left side | 28 | 58 | 75 | 46 |
| Left ear, top rear | 18 | 254 | 63 | 855 |

TABLE 3-continued

| PAD Location | Protection factor Cover according to the invention with zip fastener and with FM53 | Protection factor Cover according to the invention with zip fastener and with M40 | Protection factor Balaclava according to the invention with FM53 | Protection factor Balaclava according to the invention with C50 |
|---|---|---|---|---|
| Cheek, left side | 3000 | 201 | 3000 | 1024 |
| Behind the left ear | 276 | 152 | 102 | 33 |

The balaclava or storm cap, respectively, according to the invention with the FM53 respiratory mask displays a very high average protection factor since there is no closure present in the storm cap. The other models also display positive protective properties.

It can thus be overall demonstrated that the present invention is associated with a significant improvement in terms of the protective properties of the headgear or balaclava, respectively, according to the invention, in particular in the context of the universal applicability which was absent in the prior art.

The development and the evaluation of an improved cap/respiratory mask interface design which seals in particular in a sustainable manner the transition region discussed for ABC or CBRN protective clothing, respectively, is targeted toward an element of protective suits which is at times underestimated in terms of human life in situations of risk. The given requirements were presently focused on developing mask-specific solutions which result in a higher level of protection or a more consistent protection, as well as in a simplified and rapid procedure of donning and removing items.

Moreover, the issue of incorporating a hook-and-loop fastener in the end region of the cap was able to be solved by developing a zip fastener high up to the edge of the cap. This led to positive test results.

Consequently, the question whether it is possible to have ABC or CBRN protective caps with ergonomical properties which can be applied to all commercially relevant types of respiratory masks on the one hand, and offer an increased level of protection on the other hand, can be answered by way of a positive statement in the context of the present invention. The following components characterize the interface solutions which function the best, specifically based on a sealing element as well as a peripheral portion having a tie element (in particular having a drawstring), wherein existing closures or opening elements, respectively, may optionally also be present without reducing the protective performance in a sustainable manner.

Based on the tests or experiments, respectively, with the suitable, qualified and experienced person (SQEP) it has been established that the complete cap solution remains in position and does not slip from the mask. Chemical tests demonstrate that the cap according to the invention having a zip fastener offers the best results in conjunction with the M40 respiratory mask, wherein the further tested masks according to the invention also result in very high values in terms of the protection factor. According to the invention, it is herein also ensured over roll that the pressure of the drawstring significantly pushes the sealing element onto the mask and herein does not deform the mask body shell or the mask body.

The demand for a reliable head protection as well as for an easier and quicker process of donning and removing is constantly increasing. Therefore, this development overall is important for suppliers and users of protective equipment. The present invention offers a corresponding solution also to this end.

It is moreover important that the design of the head protection and the respiratory protection is tuned to one another so as to provide an improved protective performance of the entire protective system, this being likewise guaranteed according to the invention.

Overall, very high protection values are obtained for the designs according to the invention, or for the headgear according to the invention, respectively.

Yet further explanations pertaining to the underlying experimental set-up are provided hereunder.

A defined experimental set-up or procedure available, respectively, was chosen for testing the protective performance, or for testing the items of clothing, so as to reduce the complexity and to guarantee standardization.

In terms of the material, the following may be carried out for testing herein:

Materials which are used for chemical and biological protection can be tested by means of established material tests. Said material tests have been developed so as to protect the user from life-threatening chemicals. The chemical safety test comprises a laid drop test in which the surface of a specimen assembled in testing cells is gently subjected to drops of a hazardous material stimulant such that the hazardous material accumulates on account of permeation procedures over time. A contamination density of 10 g/m2 in the form of 1 μL droplets is often chosen in a 24 hour test. Miniaturized chemical active ingredient monitors can be used for monitoring the permeation of active ingredient vapor. The permeation by liquid is typically stated in μg/cm2, while the permeation by vapor is stated in doses. This corresponds to the average breach concentration multiplied by the duration and is stated in mg·min/m3.

The testing in terms of toxic industrial chemicals (TIC) comprises the testing according to the EN/ISO testing method. In doing so, the permeation of toxic chemicals, which are used in the industry, is measured. TIC tests are designed so as to be as strict as the safety protocols for warfare chemical tests, and similar test preparations are met since TICs in a sufficient dose can be as deadly as chemical warfare agents (CWAs).

The following can moreover be carried out for testing at system level, or for testing the entire system, respectively:

The man in simulant test (MIST) represents the primary method of the defense sector for evaluating combinations of items of clothing for protection against chemical and biological warfare agents. The MIST has been included in the current editions of the standards for protective clothing and protective equipment published by the National Fire Protection Association (NFPA). The ASTM has developed a new test method (ASTM F 2588-06) for evaluating combinations of protective clothing according to MIST. Other relevant testing methods are described in the standards of the International Organization for Standardization (ISO). The main differences between the testing methods lie in the choice of the effective testing substance (for example sulfur hexafluoride, methyl salicylate) as well as the training protocol for the test subjects. Moreover, there are also tests using actual hazardous materials in which a mobile dummy which is equipped with specimen sensors and protective clothing is placed in the test chamber.

It is an object of the whole system test (WST), as has been carried out with the present design models or headgear, respectively, to determine the level of protection of a (complete) protective suit. A specific concentration of the non-toxic compound methyl salicylate (MeS) in the form of vapor was used as an irritant or stimulant, respectively, for toxic warfare agents (mustard gas). The volunteering test person (test subject) was equipped with passively adsorbing specimen sensors (PADs) which are applied to the skin, wherein the volunteer in the context of the test was wearing the complete protective equipment. The test subject carried out a standard movement protocol in the test chamber over a defined period, the air of said test chamber having been loaded with the specific concentration of MeS vapor. The MeS which was potentially able to penetrate the suit material or make its way into the suit by way of openings was adsorbed on the PADs and subsequently analyzed. The breach doses measured at the various body regions and the local protection factors calculated therefrom were stated. For safety reasons, the test subjects were equipped with a core temperature and heart frequency measuring apparatus during the test, wherein the data obtained therefrom can also be used for obtaining an indication in terms of the thermal stress on account of the suit during the test.

The test chamber was composed of a wind tunnel having a length of 18 m and a closed circuit. The test chamber had 9 ventilators disposed in 3 rows of in each case 3 ventilators. The chamber temperature could be set between 15° C. and 35° C. MeS was used as an irritant or stimulant, respectively. The vapor was generated in a controlled evaporator/mixer behind the region of exposure such that the entire length of the tunnel could be utilized for mixing the vapor with the test chamber atmosphere. The concentration was permanently and simultaneously monitored by a gas chromatograph having a flame ionization detector. The test subject was not present in the chamber while the concentration was built up or while the chamber was being purged.

The invading or penetrating, respectively, MeS vapor was determined by passive adsorption while using passive specimen sensors (PADs) which were composed of a non-permeable polymer carrier and a polyethylene upper layer. The two layers are hot-sealed to one another such that said two layers form a type of pocket which is filled with an 80 mg Tenax TA 60/80 mesh. The methyl salicylate (MeS) penetrates the polyethylene layer at a specific velocity and is absorbed by the Tenax. The absorption rate of the PADs was measured in a separate PAD determination at low concentrations of MeS. The quantity of MeS absorbed on the specimen sensors was analyzed by means of thermodesorption and gas chromatography. The quantity located on the passive specimen sensors was converted to the penetrating dose, stated in ml/min while using the absorption rate of the specimen sensors. The measured penetrating doses were standardized to the predefined irritant dose, stated in mg·min/m3, in particular since the actual test conditions (concentration and exact duration) can at times slightly deviate from the desired settings.

The test results were issued as the protection factor which was provided by the item of clothing at a specific location of the body. The protective factors were also determined based on the standardized penetrating dose.

The specimen sensor pattern defined in the 2012 version of AEP-38 was used, that is to say that a few additional specimen sensors were placed in comparison to the original specimen sensor pattern of ASTM F2588.

The movement protocol according to the 2012 version of AEP-38 was carried out as follows:

a) Moving weights: Two 2.5 kg weights are repeatedly lifted from a shelf (at waist level) and placed on the floor. A standing position is then assumed. The weights are then lifted again and placed back onto the shelf. The right side of the test subject is aligned in the direction of the wind.
b) Sitting (face toward the wind).
c) Jumping jacks: A jumping Jack is performed approximately every 2 seconds, and the test subject changes his/her position every few seconds such that another part of the body faces the wind.
d) Sitting (face toward the wind).
e) Walking on a treadmill: The participant walks in the direction of the wind at a speed of 1.3 to 1.8 m/s.
f) Sitting (face toward the wind).
g) Climbing a ladder: The test subject repeatedly climbs up 2 to 3 steps of a ladder and touches the ceiling of the test chamber (alternating hands), then climbs back down to the floor and then squats so as to touch the floor with both hands. The test subject is aligned with the back toward the wind.
h) Sitting (back toward the wind): The participant looks from one side to another every 15 seconds, then up to the ceiling and down to the floor.

Each activity was carried out twice for 3.75 minutes within one hour.

The explanations above thus overall highlight the special advantages and properties of the headgear according to the invention, specifically also insofar as the universal applicability for a multiplicity of types of masks is concerned, while providing a sealed transition to a respective respiratory mask.

]

LIST OF REFERENCE SIGNS

- 1 Headgear (cover), in particular in the form of a hood or a balaclava
- 2*a* Cap body (main portion)
- 2*b* Field-of-view opening
- 2*c* First textile planar material (first textile material)
- 2*d* Second textile planar material (second textile material)
- 3 Respiratory mask
- 4 Sealing element
- 4*a* Sealing element body
- 5 Peripheral portion
- 5*a* Cavity
- 6 Tie element
- 7 Opening
- 8 Securing and/or locking installation
- 9 Tie element guiding installation
- 10 Opening element
- 11 Item of protective clothing
- 12 Connecting installation

The invention claimed is:

1. A headgear in the form of a hood or balaclava for protective clothing determined for civilian or military use, wherein the headgear has a cap body for head covering and a field-of-vision opening for receiving and peripherally covering a respiratory mask, wherein the headgear, in a region of the field-of-vision opening, further comprises:

an elastic and reversibly elongatable sealing element for bearing, in a sealing manner, on the respiratory mask, wherein the sealing element is disposed in an encircling manner in a peripheral region of the field-of-vision opening, wherein the sealing element is flat and wherein, in a wearing state, the sealing element lies at least substantially flat against the respiratory mask; and a peripheral portion at least partially covering or overlapping the sealing element on an outside of the sealing element facing away from the field-of-vision opening, wherein the peripheral portion is provided with a tie element such that the peripheral portion is formed in order to press and tension against the sealing element on the outside and in a direction of the field-of-vision opening, in order thereby to press and apply the sealing element against the respiratory mask in the wearing state;

wherein the sealing element is in the form of a flat strip with two opposite flat sides, wherein the sealing element is connected at one of its two longitudinal edge regions to at least one of the cap body and the peripheral portion and wherein the peripheral portion is connected at only one of its two longitudinal edge regions to at least one of the cap body and the sealing element in such a way that the remaining unconnected longitudinal edge region of the sealing element and the remaining unconnected longitudinal edge region of the peripheral portion are freely movable one above the other and independently of one another, wherein the peripheral portion is arranged and positioned above the sealing element and outside the sealing element, wherein the peripheral portion has a cavity circumferentially along the peripheral portion for receiving the tie element to provide a tie element region, and wherein the tie element region abuts on the flat side of the sealing element facing away from the respirator mask in the wearing state.

2. The headgear according to claim 1, wherein the sealing element protrudes and projects from the headgear and from the peripheral portion in the direction of the field-of-vision opening in such a way that the remaining unconnected longitudinal edge region of the sealing element in the wearing state is designed to be freely positionable with respect to the respiratory mask.

3. The headgear according to claim 1, wherein the peripheral portion exclusively at the other of two longitudinal edge regions of the peripheral portion protrudes or projects from the headgear or from the sealing element outwardly in such a way that a region of the peripheral portion at least partially covering or overlapping the sealing element is formed so as to be freely positionable on the sealing element.

4. The headgear according to claim 1, wherein the peripheral portion comprises or is formed from a textile sheet material;

wherein the peripheral portion is gathered;

wherein the peripheral portion is circumferentially disposed in an edge region of the field-of-vision opening;

wherein the cavity is formed as a channel;

wherein the tie element is received circumferentially along the peripheral portion in the cavity of the peripheral portion in a freely movable manner; and wherein the peripheral portion has a tie element guiding installation, wherein the tie element guiding installation is arranged circumferentially along an edge section of the peripheral portion and wherein the tie element guiding installation delimits the cavity of the edge section of the peripheral portion.

5. The headgear according to claim 1, wherein the tie element is a cord;

wherein the tie element is formed as a round cord;

wherein the tie element has an at least substantially round cross-section;

wherein the tie element is elastic and reversibly extensible; and wherein the tie element comprises or consists of at least one elastic and reversibly stretchable material.

6. The headgear according to claim 1, wherein the sealing element, in the wearing state, rests with one of its flat sides against the respiratory mask and is positioned with one of its flat sides relative to the respiratory mask;

wherein the sealing element, in the wearing state, has one of its flat sides facing the respiratory mask.

7. The headgear according to claim 1, wherein the sealing element is elastic or reversibly expandable;

wherein the sealing element comprises or consists of at least one elastic or reversibly stretchable material, wherein the sealing element comprises a multifilament yarn with a plurality of individual filaments of the elastic and reversibly stretchable material of the sealing element, wherein the sealing element additionally contains a textile component; and wherein the sealing element has a coating for the purpose of sealing or adhering or preventing the sealing element from slipping with respect to the respiratory mask, wherein the coating is applied on the side of the sealing element facing the respiratory mask in the state of wearing.

8. The headgear according to claim 1, wherein the cap body comprises a first textile sheet material;

wherein the first textile sheet material is arranged in the wearing state on the side of the headgear facing away from a user;

wherein the first textile sheet material is formed as knitted fabric; and wherein the peripheral portion is formed by the first textile sheet material.

9. The headgear according to claim 1, wherein the cap body comprises a second textile sheet material;

wherein the second textile sheet material is arranged in the wearing or application state on the side of the headgear facing a user;

wherein the second textile sheet material is formed in a multilayer or multilayered manner;

wherein the second textile sheet material comprises a base textile material in the form of a knitted fabric;

wherein the second textile sheet material additionally comprises a carrier textile material in the form of a knitted fabric; and wherein the second textile sheet material has a material in the form of activated carbon particles in granular or spherical form or is equipped therewith.

10. The headgear according to claim 1, wherein the cap body has a further inner material which is arranged on an edge side of the cap body towards or at the field-of-vision opening and adjoins the peripheral portion or the sealing element on the edge side; and wherein the further inner material is annular or extends completely along the field-of-vision opening.

11. The headgear according to claim 1, wherein the sealing element comprises or is formed from a sealing element body or is a component of a sealing element body;

wherein the sealing element body is formed exclusively by the sealing element; or else wherein the sealing element body has, in addition to the sealing element, at least one further portion, wherein the sealing element body having the sealing element and the further portion is at least substantially L-shaped or U-shaped, wherein the sealing element body having the sealing element and the further portion surrounds or encloses an edge region of a textile planar material or materials of the headgear.

12. A method for providing a NBC protective clothing determined for the civilian or military sector, wherein the method comprises the step of using the headgear according to claim 1.

13. A NBC protective piece of clothing determined for the civilian or military sector, wherein the NBC protective clothing comprises the headgear according to claim 1.

14. A method for sealing the transition between a headgear and a respiratory mask, wherein the method comprises the step of using an elastic and reversibly elongatable sealing element in combination with a peripheral portion, wherein the headgear having a cap body for head covering and a field-of-vision opening for receiving and covering the respiratory mask at the edge is further provided in the region of the field of vision opening with:

the elastic and reversibly elongatable sealing element for bearing, in a sealing manner, on the respiratory mask, wherein the sealing element is disposed in an encircling manner in a peripheral region of the field-of-vision opening, wherein the sealing is element flat and wherein, in the wearing state, the sealing element lies at least substantially flat against the respiratory mask; and the peripheral portion at least partially covering or overlapping the sealing element on an outside of the sealing element facing away from the field-of-vision opening, wherein the peripheral portion is provided with a tie element such that the peripheral portion is formed in order to press and tension against the sealing element on the outside and in a direction of the field-of-vision opening, in order thereby to press and apply the sealing element against the respiratory mask in the wearing state;

wherein the sealing element is in the form of a flat strip with two opposite flat sides, wherein the sealing element is connected at one of its two longitudinal edge regions to at least one of the cap body and the peripheral portion and wherein the peripheral portion is connected at only one of its two longitudinal edge regions to at least one of the cap body and to the sealing element in such a way that the remaining unconnected longitudinal edge region of the sealing element and the remaining unconnected longitudinal edge region of the peripheral portion are freely movable one above the other and independently of one another, wherein the peripheral portion is arranged and positioned above the sealing element and outside the sealing element, wherein the peripheral portion has a cavity circumferentially along the peripheral portion for receiving the tie element to provide a tie element region, and wherein the tie element region abuts on the flat side of the sealing element facing away from the respirator mask in the wearing state.

15. A headgear in the form of a hood or balaclava for protective clothing determined for civilian or military use, wherein the headgear has a cap body for head covering and a field-of-vision opening for receiving and peripherally covering a respiratory mask, wherein the headgear, in a region of the field-of-vision opening, further comprises:

an elastic and reversibly elongatable sealing element for bearing, in a sealing manner, on the respiratory mask, wherein the sealing element is disposed in an encircling manner in a peripheral region of the field-of-vision opening, wherein the sealing element is flat and wherein, in the wearing state, the sealing element lies at least substantially flat against the respiratory mask; and a peripheral portion partially covering or overlapping the sealing element on an outside of the sealing element facing away from the field-of-vision opening, wherein the peripheral portion is provided with a tie element such that the peripheral portion is formed in order to press and tension against the sealing element on the outside and in a direction of the field-of-vision opening, in order thereby to press and apply the sealing element against the respiratory mask in the wearing state;

wherein the sealing element is in the form of a flat strip with two opposite flat sides, wherein the sealing element is connected at one of its two longitudinal edge regions to at least one of the cap body and the peripheral portion and wherein the peripheral portion is connected at only one of its two longitudinal edge regions to at least one of the cap body and the sealing element in such a way that the remaining unconnected edge region of the sealing element and the remaining unconnected edge region of the peripheral portion are freely movable one above the other and independently of one another, wherein the peripheral portion is arranged and positioned above the sealing element, wherein the peripheral portion has a cavity circumferentially along the peripheral portion for receiving the tie element to provide a tie element region, and wherein the tie element region abuts on the flat side of the sealing element facing away from the respirator mask in the wearing state.

16. A method for sealing the transition between a headgear and a respiratory mask, wherein the method comprises the step of using an elastic and reversibly elongatable sealing element in combination with a peripheral portion, wherein the headgear having a cap body for head covering and a field-of-vision opening for receiving and covering the respiratory mask at the edge is further provided in the region of the field of vision opening with:

the sealing element for bearing, in a sealing manner, on the respiratory mask, wherein the sealing element is disposed in an encircling manner in a peripheral region of the field-of-vision opening, wherein the sealing element is flat and wherein, in the wearing state, the sealing element lies at least substantially flat against the respiratory mask; and the peripheral portion at least partially covering or overlapping the sealing element on an outside of the sealing element facing away from the field-of-vision opening, wherein the peripheral portion is provided with a tie element such that the peripheral portion is formed in order to press and tension against the sealing element on the outside and in a direction of the field-of-vision opening, in order thereby to press and apply the sealing element against the respiratory mask in the wearing state;

wherein the sealing element is in the form of a flat strip with two opposite flat sides, wherein the sealing element is connected at one of its two longitudinal edge regions to at least one of the cap body and the peripheral portion and wherein the peripheral portion is connected at only one of its two longitudinal edge regions to at least one of the cap body and to the sealing element in such a way that the remaining unconnected edge region of the sealing element and the remaining unconnected edge region of the peripheral portion are freely movable one above the other and independently of one another, wherein the peripheral portion is arranged and positioned above the sealing element and outside the sealing element, wherein the peripheral portion has a cavity circumferentially along the peripheral portion for receiving the tie element to provide a tie element region, and wherein the tie element region abuts on the flat side of the sealing element facing away from the respirator mask in the wearing state.

* * * * *